United States Patent
McCall et al.

(10) Patent No.: US 7,362,218 B2
(45) Date of Patent: Apr. 22, 2008

(54) MOTION DETECTION USING A SHOCK SENSOR IN A REMOTE TIRE PRESSURE MONITORING SYSTEM

(75) Inventors: Alan Kenneth McCall, Ballymena (GB); William David Stewart, Antrim (GB)

(73) Assignee: Schrader Bridgeport International, Inc., Altavista, VA (US)

(*) Notice: Subject to any disclaimer, the term of this patent is extended or adjusted under 35 U.S.C. 154(b) by 56 days.

(21) Appl. No.: 10/761,772

(22) Filed: Jan. 20, 2004

(65) Prior Publication Data

US 2005/0156722 A1 Jul. 21, 2005

(51) Int. Cl.
- *B60C 19/00* (2006.01)
- *B60C 19/08* (2006.01)
- *B60C 23/00* (2006.01)
- *B60C 23/02* (2006.01)

(52) U.S. Cl. .............. 340/447; 340/442; 340/443; 340/444; 340/445; 340/446; 340/448; 73/146.2; 73/146.3; 73/146.4; 73/146.5; 73/146.8; 73/146; 152/152.1

(58) Field of Classification Search ........ 340/442–448; 73/146.1–146.5, 146.8; 152/152.1
See application file for complete search history.

(56) References Cited

U.S. PATENT DOCUMENTS

| 4,468,618 A | 8/1984 | Zander ............... 324/165 |
| 4,566,327 A | 1/1986 | Rider ................. 73/510 |
| 4,783,992 A * | 11/1988 | Ishibashi ............ 73/146 |
| 4,814,701 A | 3/1989 | Wallrafen ........... 324/160 |
| 4,947,151 A * | 8/1990 | Rosenberger ....... 340/426.33 |
| 5,378,973 A * | 1/1995 | Kim .................. 318/640 |
| 5,557,268 A * | 9/1996 | Hughes et al. ...... 340/933 |
| 5,600,301 A | 2/1997 | Robinson, III |
| 5,602,524 A | 2/1997 | Mock et al. |
| 5,612,671 A | 3/1997 | Mendez et al. |
| 5,631,630 A * | 5/1997 | McSweeney ........ 340/522 |
| 5,774,047 A | 6/1998 | Hensel, IV |

(Continued)

FOREIGN PATENT DOCUMENTS

DE 100 12 458 A1 9/2001

(Continued)

OTHER PUBLICATIONS

Memsic, Inc. brochure titled "Low Cost, ±1 g Dual Axis Accelerometer with Analog Outputs—MXA2500A", Jan. 2002, pp. 1-8.

(Continued)

*Primary Examiner*—Benjamin C. Lee
*Assistant Examiner*—Lam Pham
(74) *Attorney, Agent, or Firm*—J. L. Mahurin, Esq.; C. H. Castleman, Esq.; J. A. Thurnau, Esq.

(57) ABSTRACT

A tire monitor for mounting to a vehicle as part of a remote tire monitoring system includes a tire condition sensor to produce a tire condition signal, a controller coupled to the tire condition sensor to control operation of the tire monitor, and a radio circuit coupled to the controller to transmit radio signals based at least in part on the tire condition signal. A shock sensor is coupled to the controller of the tire monitor to produce a motion signal indicating motion of the tire monitor.

7 Claims, 27 Drawing Sheets

U.S. PATENT DOCUMENTS

| | | | |
|---|---|---|---|
| 5,838,229 A | 11/1998 | Robinson, III | |
| 5,880,363 A | 3/1999 | Meyer et al. | |
| 5,883,305 A | 3/1999 | Jo et al. | |
| 6,018,993 A | 2/2000 | Normann et al. | |
| 6,034,597 A | 3/2000 | Normann et al. | |
| 6,062,072 A | 5/2000 | Mock et al. | |
| 6,112,585 A | 9/2000 | Schrottle et al. | |
| 6,112,587 A | 9/2000 | Oldenettel | |
| 6,181,241 B1 | 1/2001 | Normann et al. | |
| 6,204,758 B1 | 3/2001 | Wacker et al. | |
| 6,218,936 B1 | 4/2001 | Imao | |
| 6,232,875 B1 * | 5/2001 | DeZorzi | 340/442 |
| 6,252,498 B1 | 6/2001 | Pashayan, Jr. | |
| 6,259,361 B1 | 7/2001 | Robillard et al. | |
| 6,271,748 B1 | 8/2001 | Derbyshire et al. | |
| 6,278,363 B1 | 8/2001 | Bezek et al. | |
| 6,292,096 B1 * | 9/2001 | Munch et al. | 340/445 |
| 6,304,172 B1 | 10/2001 | Katou et al. | |
| 6,340,930 B1 | 1/2002 | Lin | |
| 6,384,720 B1 | 5/2002 | Juzswik et al. | |
| 6,417,766 B1 | 7/2002 | Starkey | 340/447 |
| 6,441,727 B1 | 8/2002 | LeMense | 340/442 |
| 6,446,502 B1 | 9/2002 | Normann et al. | |
| 6,466,887 B1 * | 10/2002 | Weinbrenner | 702/141 |
| 6,489,888 B1 | 12/2002 | Honeck et al. | |
| 6,518,875 B2 | 2/2003 | DeZorzi | |
| 6,518,876 B1 | 2/2003 | Marguet et al. | |
| 6,581,449 B1 | 6/2003 | Brown et al. | |
| 6,633,229 B1 | 10/2003 | Normann et al. | 340/447 |
| 6,705,155 B2 | 3/2004 | Katou | 73/146 |
| 6,741,169 B2 * | 5/2004 | Magiawala et al. | 340/438 |
| 6,788,193 B2 | 9/2004 | King et al. | 340/447 |
| 7,010,968 B2 * | 3/2006 | Stewart et al. | 73/146 |
| 2001/0002451 A1 | 5/2001 | Breed | |
| 2002/0047715 A1 | 4/2002 | Holm | |
| 2006/0044125 A1 * | 3/2006 | Pierbon | 340/442 |

FOREIGN PATENT DOCUMENTS

| | | |
|---|---|---|
| EP | 0 760 299 B1 | 3/1999 |
| EP | 1 172 656 | 1/2002 |
| WO | WO 01/69265 A1 | 9/2001 |

OTHER PUBLICATIONS

Memsic, Inc. brochure titled "Application Note #AN-00MX-001: The Fundamentals", undated but prepared prior to Apr. 18, 2002, pp. 1-3.

International Search Report in International Application No. PCT/US03/11582, dated Aug. 11, 2003, 4 pages.

* cited by examiner

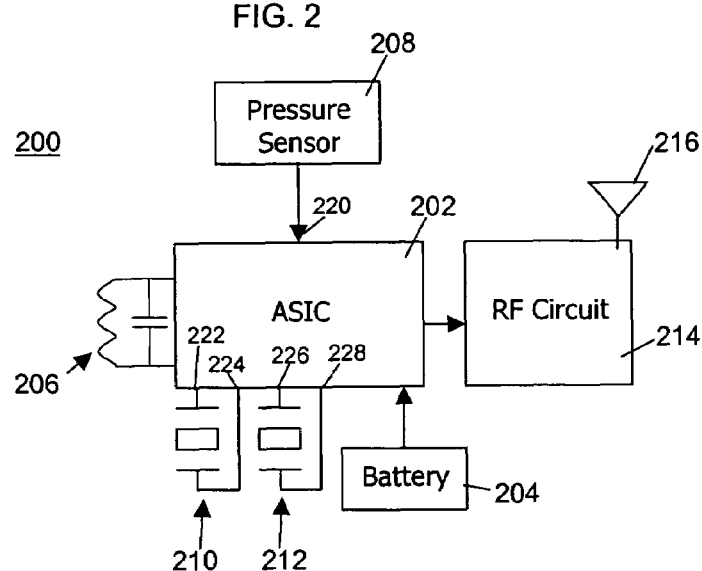
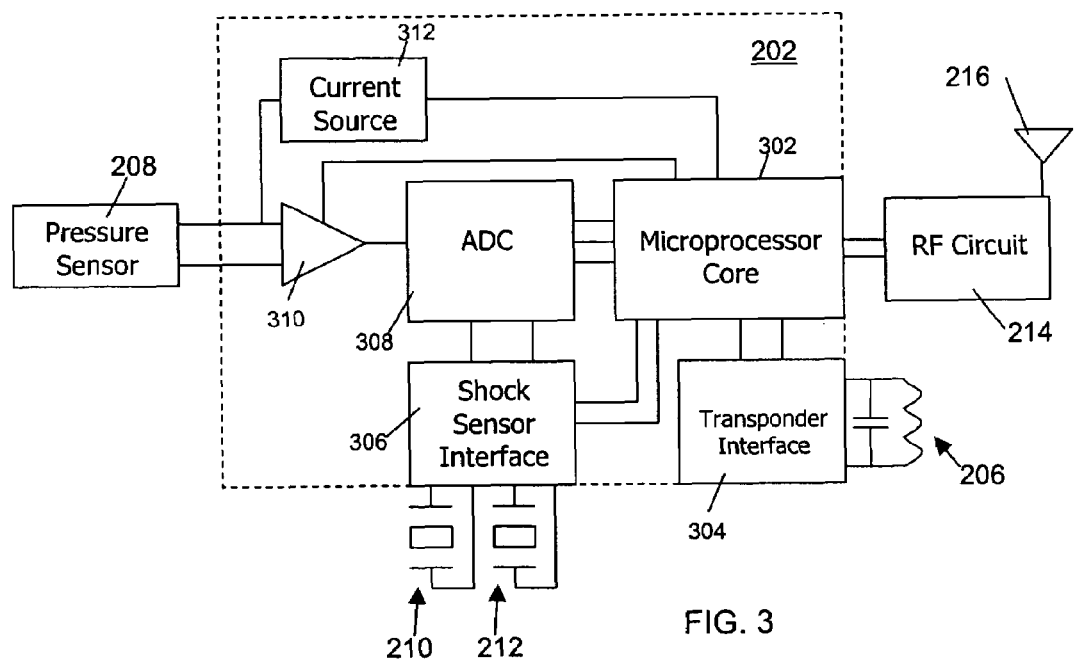

(a)

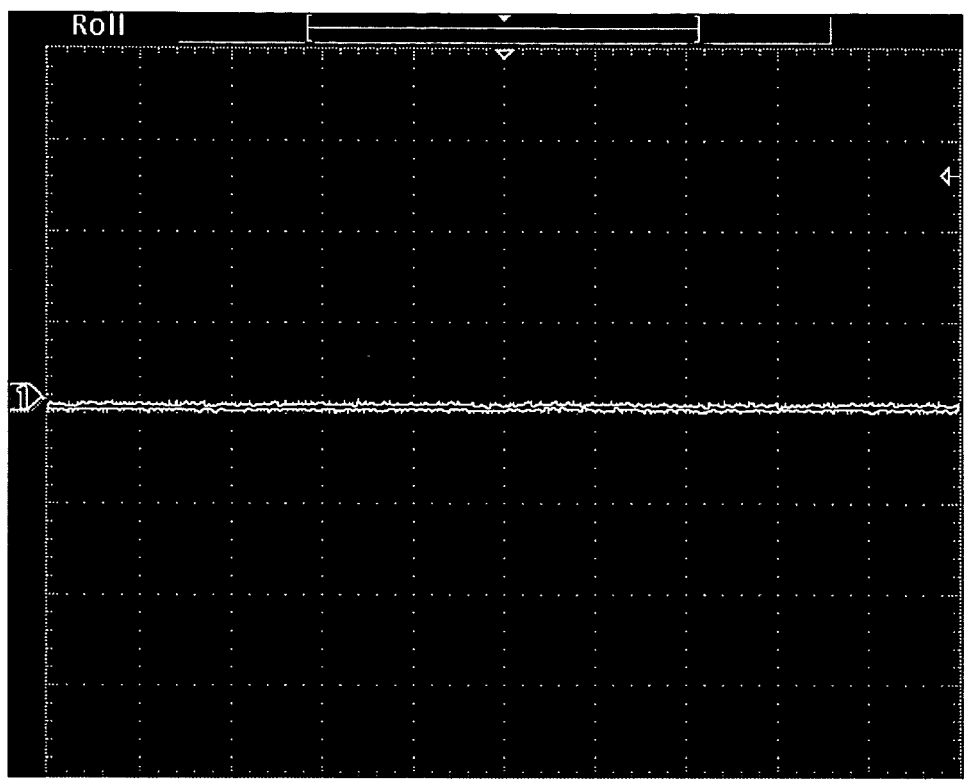
(b)
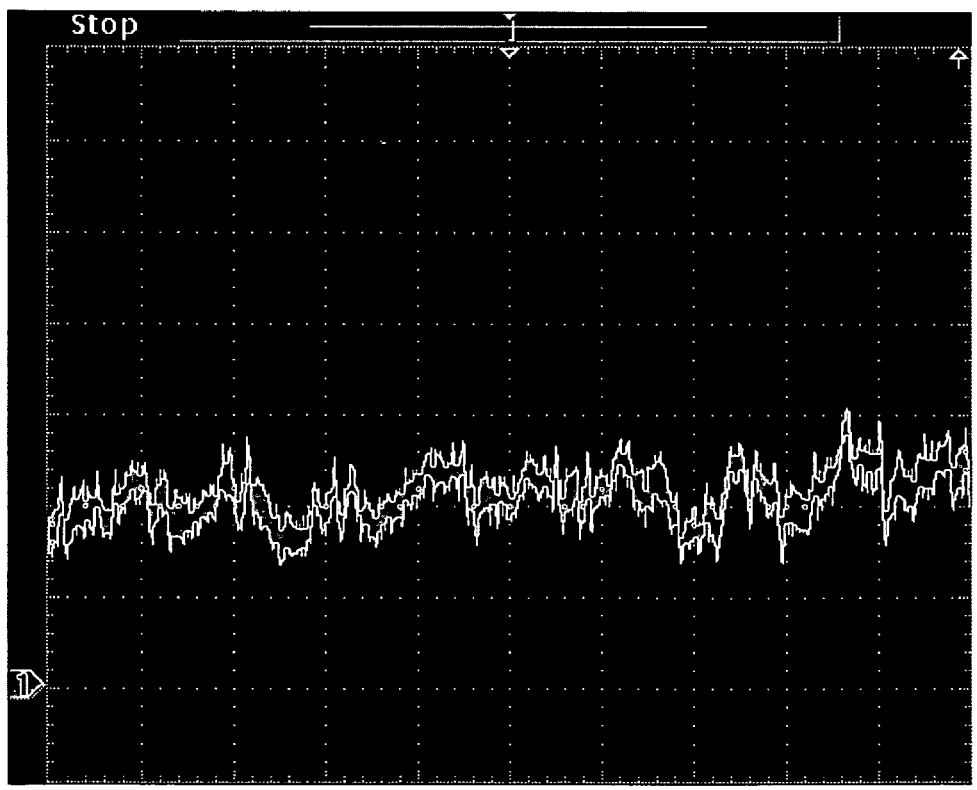
(c)
FIG. 9

A new drive cycle is defined as when the sensor has returned to a state of motion after being stationary for at least 10 minutes

MOTION DETECTION USING A SHOCK SENSOR IN A REMOTE TIRE PRESSURE MONITORING SYSTEM

CROSS REFERENCE TO RELATED APPLICATIONS

The present application is related to U.S. application Ser. No. 10/761,734, entitled "Determination of Wheel Sensor Position Using Shock Sensors and a Wireless Solution," commonly assigned with the present application, filed on even date herewith and incorporated herein in its entirety by this reference.

REFERENCE TO COMPUTER PROGRAM LISTING APPENDIX

A computer program listing appendix is included containing computer program code listings on a CD-Rom pursuant to 37 C.F.R. 1.52(e) and is hereby incorporated by reference in its entirety. The total number of compact discs is 1 (two duplicate copies are filed herewith). Each compact disc includes 15 files in two folders as shown below. Each compact disc includes 127,512 bytes. The creation date of the compact disc is Jan. 20, 2004. The files included on the compact disc and their respective sizes and creation dates are listed below:

| Folder | File name | Size | Date of Creation |
| --- | --- | --- | --- |
| Motion Detection Software | adcony.asm | 919 bytes | Jan. 23, 2003 |
| | delay | 6322 bytes | Dec. 4, 2002 |
| | framtx.asm | 3663 bytes | Feb. 5, 2003 |
| | Main.asm | 6530 bytes | Jan. 16, 2004 |
| | motion.asm | 4591 bytes | Feb. 5, 2003 |
| | quad.asm | 10719 bytes | Dec. 4, 2002 |
| | startup.asm | 3506 bytes | Dec. 4, 2002 |
| | tx_sync.asm | 2030 bytes | Jan. 23, 2003 |
| Wireless Software | delay.asm | 6322 bytes | Aug. 8, 2002 |
| | dirchk6.asm | 17955 bytes | Dec. 4, 2002 |
| | framerx.asm | 11516 bytes | Nov. 29, 2002 |
| | frametx.asm | 7452 bytes | Jun. 6, 2003 |
| | frd3_5.asm | 19078 bytes | Dec. 19, 2003 |
| | inital.asm | 2894 bytes | Nov. 29, 2002 |
| | wirbd3_5.asm | 19036 bytes | May 29, 2003 |

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

In one aspect, the present invention relates generally to a remote tire monitoring system and components for such a system. In other aspects, the present invention relates to methods and apparatus for automatically wireless autolocation for tire monitors in such a system.

Systems have been developed to monitor a characteristic such as tire pressure of a vehicle and to report the characteristic to a receiver at a central monitoring station using radio transmissions. A monitor is located at each tire and periodically takes a measurement of the tire characteristic. The tire monitor senses activity through action of a roll switch. The roll switch is a mechanical switch using a ball and spring to sense when the vehicle is at rest or is in motion, and to measure tire characteristics accordingly. The monitor then transmits the results of the measurement in a radio frequency transmission to the central monitoring station which produces an alarm or a display in response to the measurement.

One problem with such systems has been the need to program the location of the transmitters at the central station. To be fully useful, the tire characteristic data is preferably associated with the tire which originated the measurement when presenting a display or alarm. Each monitor includes identification information which can be transmitted with the measurement. The tire monitor is preferably activated to produce this information and the information is then conveyed to the central station and associated with the position of the tire.

In the technique of U.S. Pat. No. 5,600,301, the tire monitors each include a reed switch or other magnetic device. A magnet is passed near the reed switch, causing the monitor to transmit a radio frequency transmission that includes identification data. A service technician repeats this process at each wheel and then loads the identification and position information into the central monitoring station. Another method provides a printed bar code on each tire monitor which contains the identification information and which may be read with a suitable bar code reader.

In U.S. Pat. No. 5,880,363, an activation signal is provided from the central controller to a low frequency transmitter at each wheel well. The transmitter generates a low frequency signal to activate the tire monitor. The tire pressure monitor responds by generating a long wave identification signal and transmitting that signal with tire pressure and identification data directly to the control unit. The long wave identification signal is used to identify the position of the tire by distinguishing this transmission from other transmissions received by the controller.

U.S. Pat. No. 5,883,305 discloses two-way communication of data by radio signals. A tire pressure monitor is activated by a radio frequency signal transmitted by an antenna in the wheel well adjacent the tire. The tire pressure monitor transmits a second radio frequency signal which is detected by the wheel well antenna. The second signal is demodulated to detect that tire pressure data.

U.S. Pat. No. 6,204,758B1 discloses a tire monitor including a tangential accelerometer for detecting acceleration of the tire monitor. Tangential acceleration along a single axis is detected to determine acceleration. Position information for the tire monitor is determined in response to the acceleration.

These previous techniques have been limited in effectiveness. The magnetic programming technique may be subject to interference and crosstalk, for example in a factory where many such tire monitors are being assembled with tires and vehicles. The bar code label system requires a label at each tire which can be lost or become dirty or illegible. The apparatus for transmitting a long wave activation signal and generating a long wave identification signal therefrom is too expensive for some applications. The two-way data communication technique requires demodulation of the received radio signals at the wheel well and coaxial cabling back to the central controller, both of which add to the cost of the system. The tangential acceleration which must be sensed requires a highly sensitive accelerometer which may be prohibitively expensive in the current application.

A further limitation of some of these prior techniques is the manual operation requiring activation by a service technician. A system is desired which automatically conveys wheel position data to the receiver. Such a system would be particularly useful after any change in tire position, such as tire rotation or replacement of a tire.

U.S. patent application Ser. No. 09/557,682, commonly assigned with the present application, discloses a system and method in which tire monitors are located at each wheel of the vehicle and periodically transmit tire data along with a tire monitor identifier. Four small, inexpensive RF detectors are located near each wheel. Each RF detector is connected to the central control unit by a power line and a ground line. When a tire monitor transmits data by emitting an RF transmission, the RF detector that is closest to the transmitter will detect the burst of RF energy. The RF detector responds to the RF energy by modulating the power line to the control unit with the envelope of the transmitted data. The control unit detects this modulation on one of its power lines. Also, the RF receiver of the control unit receives and demodulates the data transmitted by the tire monitor. The control unit associates the received data with the position indication provided by the modulation on the power line. When the positions of the wheels on the vehicle are changed, the control unit can determine the new position using the modulated power line in association with the tire monitor identifier in the transmitted data.

While this system has been very successful in application, a system and components featuring reduced cost and improved durability is desired. The roll switch included in prior tire monitors is necessarily subject to a lot of forces during use, including high-g forces during vehicle motion and shock and vibration as the tire traverses rough pavement. Also, the roll switch tends to degrade in performance over time and become a non-ideal switch. Still further, presently available roll switches are not true surface-mount devices of the type that can automatically be assembled on a printed circuit board, and the presently available roll switch is relatively expensive. Accordingly, there is a need for an improved tire monitor and remote tire pressure monitoring system using such improved tire monitors.

BRIEF SUMMARY

By way of introduction, a tire monitor for mounting to a vehicle as part of a remote tire monitoring system includes a tire condition sensor to produce a tire condition signal, a controller coupled to the tire condition sensor to control operation of the tire monitor, and a radio circuit coupled to the controller to transmit radio signals based at least in part on the tire condition signal. A piezoelectric or piezoceramic sensor is coupled to the controller of the tire monitor to produce a motion signal indicating motion of the tire monitor.

The foregoing summary has been provided only by way of introduction. Nothing in this section should be taken as a limitation on the following claims, which define the scope of the invention.

BRIEF DESCRIPTION OF THE DRAWINGS

FIG. 2 is a block diagram of a tire monitor for use in the remote tire monitor system of FIG. 1;

FIG. 3 is a block diagram showing one embodiment of the controller of the tire monitor of FIG. 2;

DETAILED DESCRIPTION OF THE PRESENTLY PREFERRED EMBODIMENTS

Figure 1:
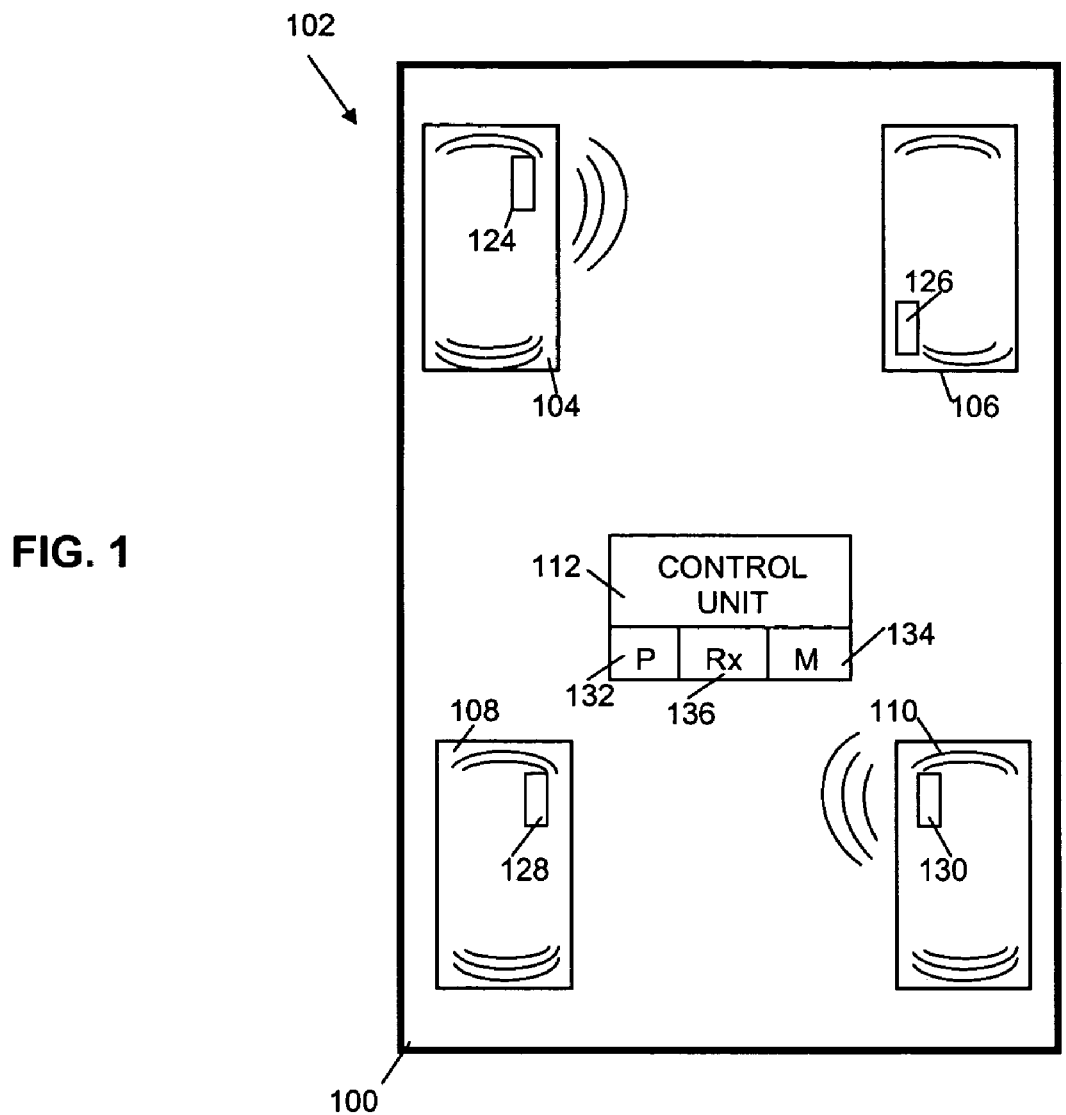
FIG. 1 is a block diagram of one embodiment of a remote tire monitor system shown in conjunction with portions of a vehicle.

Referring now to the drawing, FIG. 1 is a block diagram of a remote tire monitor system 100 shown in conjunction with portions of a vehicle 100 with a remote tire monitor system 102. The vehicle 100 includes wheels 104, 106, 108, 110. Each wheel includes a tire mounted on a rim. In other embodiments, the vehicle 100 may have other numbers of wheels. For example, in one particular embodiment, a truck has 18 wheels.

The remote tire monitor system 102 in the illustrated embodiment includes a control unit 112 and tire monitors 124, 126, 128, 130. The tire monitors 124, 126, 128, 130 measure tire characteristics and transmit tire data for reception and processing by the control unit 112. The system 102 may include other components as well. Thus, the illustrated embodiment of FIG. 1 is exemplary only.

The remote tire monitor system 102 as illustrated in FIG. 1 includes a tire monitor associated with each wheel of the vehicle 100. Thus, a tire monitor 124 is associated with wheel 104; tire monitor 126 is associated with wheel 106; tire monitor 128 is associated with wheel 108; and tire monitor 130 is associated with wheel 110. The tire monitors are generally of the type described herein and are configured to detect a tire condition such as tire pressure and to occasionally transmit a transmission including tire data, such as tire pressure data and identification information uniquely identifying the respective tire monitor.

Each of the tire monitors 124, 126, 128, 130 includes a battery powered radio frequency (RF) transmitter and a sensor such as a pressure sensor for measuring a tire characteristic. The tire monitor 126 converts the measured tire characteristic to tire data. The tire data is encoded for transmission from the wheel 106. Any suitable tire monitor may be used. The tire monitors 124, 126, 128, 130 will be described in greater detail below in conjunction with FIG. 2.

Regarding the control unit 112, any suitable control unit may be used in the system 102. In one exemplary embodiment, the control unit 112 includes a controller 132, a memory device 134 and a receiver 136 to receive radio frequency transmissions from tire monitors of the tire monitor system 102. The controller 132 forms a processing means and may be any suitable control device such as a microprocessor, microcontroller, application specific integrated circuit (ASIC) or logic device coupled together to perform the necessary functions described herein. The control unit 112 in some applications is coupled to a vehicle data communication bus for exchange of data about vehicle conditions. For example, some vehicles use a CAN bus to communicate data internally among the components of the vehicle. One example of this data is data about the speed of the vehicle.

In one embodiment, the controller 132 is implemented as a processor. The processor stores position data for a plurality of tire monitors of the remote tire monitor system 102. The controller 132 receives tire data and position data as transmitted from the tire monitors and decoded at the receiver 136. In the illustrated embodiment, when tire data and position data are received at the processor, the processor retrieves stored position data from the memory 134. In one embodiment, the position data are stored in association with a position on the vehicle, such as left front, left rear, right front or right rear. The received position data is compared with the stored position data. If there is no change, the position data is not updated and further processing may occur using the received tire data. However, the processor updates the position data for the transmitting tire monitor when the position of the transmitting tire monitor varies from the stored position data for the transmitting tire monitor. Thus, the controller 132 includes a memory 134 and a processor configured to store in the memory 134 positions of the plurality of tire monitors including the position of the transmitting tire monitor which originated the received position data.

The memory device 134 forms a memory means for storing data and preferably is formed of semiconductor memory. In the illustrated embodiment, the memory device 134 of the control unit 112 includes persistent memory or nonvolatile memory such as an E$^2$PROM, and working memory such as random access memory (RAM). For example, the persistent memory may be used to store tire identifiers and pressure data over extended periods of time, such as when the vehicle 100 is parked.

The receiver 136 may be any suitable radio receiver circuit. The receiver 136 and the tire monitors of the system 102 must be designed to cooperate so that data encoded and modulated for transmission by the tire monitors is reliably demodulated and decoded at the receiver. The receiver 136 preferably includes a received signal strength indication (RSSI) circuit for determining relative strength of transmissions from tire monitors received at the receiver. Any suitable RSSI circuit can be used.

FIG. 2 is a block diagram of a tire monitor 200 in accordance with a further embodiment of the present invention. The tire monitor 200 includes a controller 202, a battery 204, a transponder coil 206, a pressure sensor 208, one or more piezoelectric motion sensors such as a first shock sensor 210 and a second shock sensor 212, an RF circuit 214 and an antenna 216. It is envisioned that each wheel or tire of a vehicle will have a tire monitor such as the tire monitor 200 associated with it to monitor tire conditions such as tire pressure. The tire monitor is actuated in part by signals produced by the shock sensors 210, 212 and is controlled by the controller 202. The controller 202 determines positioning of the tire monitor, for example, on the left side or the right side of the vehicle, based on the signals produced by the shock sensors 210, 212. The controller 202 thus forms a tire monitor position information determining circuit which is responsive to an acceleration signal from the shock sensors 210, 212. The controller 202 forms a control circuit configured to determine position information about position of the tire monitor on the vehicle in response to an acceleration signal from the shock sensors 210, 212.

The controller 202 may be any suitable processor, microprocessor, microcontroller or other suitable data processing device for performing the functions described herein. In one embodiment, the controller 202 is configured as an application specific integrated circuit (ASIC). The ASIC is designed using pre-existing circuit blocks which are capable of performing the necessary functions, either alone or in conjunction with controlling software. The controller 202 generally further includes memory for storing data and instructions for use in conjunction with received and generated data. The controller 202 will be described in further detail below in conjunction with FIG. 3.

The battery 204 provides operating power for the tire monitor 200, including the controller 202. The battery 204 may be replaceable or may be permanently installed.

The transponder coil 206 is configured for actuation in response to electromagnetic energy imparted from external to the tire monitor 200. In response to the imparted RF energy, the transponder coil 206 produces a voltage or current signal which may be detected by the controller 202. Communication with the controller 202 using a transponder coil in this matter is known for actuating operation of a tire monitor such as the tire monitor 200 or for communicating data or other information produced at the tire monitor 200. In the illustrated embodiment, the transponder coil 206 may detect a programming actuation produced by bringing an exciter into the vicinity of the transponder coil 206. The exciter actuates the transponder coil to produce a signal detectable by the controller 202. This may cause the controller, for example, to transmit tire information in a manner to be described below. This initial transmission of tire information may then be used to program the control unit of a remote tire monitoring system of the type described herein.

The pressure sensor 208 forms a sensing device for detecting a tire condition and producing tire data in response thereto. In the illustrated embodiment, the pressure sensor 208 detects the pneumatic air pressure of the tire with which the tire monitor 200 is associated. In alternate embodiments, the pressure sensor 208 may be supplemented with or replaced by a temperature sensor or other devices for detecting tire data. An indication of the tire data is provided by the controller 202 at an input 220.

The shock sensor 210 forms a motion switch or rotational sensor for the tire monitor 200. The shock sensors 210, 212 in combination form a dual axis accelerometer and determine first acceleration along a first axis and second acceleration along a second axis. As will be described below in conjunction with FIGS. 4-8, during operation, the first axis and the second axis lie in a rotational plane of the respective tire with which the tire monitor 200 is associated. The tire monitor 200 and its associated wheel rotate about a third axis which is orthogonal to the first axis and the second axis.

The shock sensors 210, 212 are one example of a force sensor, displacement sensor, or rotation sensor. The shock sensors may also be referred to generically as a piezoelectric rotation sensor. Other types of piezoelectric rotation sensors may be used in place of the shock sensors described herein.

In accordance with the preferred embodiment, the shock sensors 210, 212 are embodied as commercially available shock sensors of the type which detect a shock as acceleration and produce an electrical signal proportional to the acceleration. Examples are the PKGS-xxRA series shock sensors available from Murata, Inc. These devices are exemplary only and other devices may be substituted. These devices use a piezoelectric ceramic structure as an acceleration detection element. These devices are of the charge-sensitive type which detects acceleration in the form of an electrical charge output. Shock sensors are not mechanical switches but are sensors. They do not dissipate power but actually generate current. A typical value of the charge sensitivity of these devices is 0.153 pC/G. These devices provide an output voltage proportional to applied acceleration, typically 1 mV/g, where g is the acceleration due to gravity. Each shock sensor has a characteristic resonance frequency, typically approximately 27 KHz. Previously, such devices have been used for write protection in hard disk drives and for airbag deployment in automobiles. Preferably, the shock sensors 210, 212 can be assembled to a printed circuit board using conventional surface mount soldering techniques.

The main difference between an accelerometer and a shock sensor is that the output signal from a shock sensor is related to a change of force applied to the shock sensor, whereas the output signal from an accelerometer is proportional to the absolute force applied. One benefit of using shock sensors in an application such as that described herein is that use of the shock sensor eliminates issues of detection of small signal variations in the presence of large voltage offsets caused by centrifugal force at high speeds, a problem inherent with use of an accelerometer. Also because accelerometers measure absolute force applied, at some point when detecting a small signal with a big signal offset, the accelerometer saturates at high speed. In a previous design using used a dual axis accelerometer, the tire monitor system could not detect wheel location at speeds above 60 mph because the accelerometer had saturated due to the high G force. As an example, using a 16" wheel rim at 100 mph, the centrifugal force seen by the sensor is 260 g. The circuit analyzing the accelerometer output signal will be looking for a variance of +/−1 g on this offset. The offset problem can be addressed by using complicated filtering and amplification. However, this adds complexity and cost to the design and hinders the performance at high speeds. The shock sensor is especially good at high speeds and works well down to 1 mph if required. Also, low cost accelerometers require substantial supply power to operate and so to use them in a RTPM sensor will limit the battery life of the sensor. In contrast, the shock sensor does not draw current but actually generates current.

Another issue arises when using dual axis accelerometers. Accelerometers are specified for operation in relation to three geometric axes x, y and z, where the x and y axes are parallel to the plane of the printed circuit board (PCB) on which the accelerometer is mounted with the z axis normal to the plane of the printed circuit board. However, accelerometer vendors only offer x and y plane device. Tire monitor use requires an x and z plane dual axis accelerometer. The available dual axis accelerometer can not simply be mounted on its side because the devices are mounted to the surface of a printed circuit board. To orient the dual axis accelerometer on its side would require a small daughter board PCB which is mounted to the main PCB of the tire monitor. There is no off the shelf x and z plane dual axis accelerometers on the market as there is minimal demand for them. A custom made x and z plane device will have huge development and part costs.

Operation of the tire monitor 200 in conjunction with the shock sensors 210, 212 will be described below in conjunction with FIGS. 4 through 7. In the illustrated embodiment, the shock sensors 210, 212 are used both as a motion switch, to determine when the tire is moving, and to determine what side of the vehicle the tire is located on. The shock sensor 210 is coupled with the controller 202 between inputs 222, 224. Similarly, the shock sensor 212 is coupled with the controller 202 between inputs 226, 228. The shock sensor 210 may be referred to as shock sensor X and the shock sensor 212 may be referred to as shock sensor Y.

The RF circuit 214 includes circuitry necessary for transmitting radio frequency signals conveying tire data, identification data, status data and other information from the tire monitor 200. The antenna 216 is electrically coupled with the RF circuit 214 to facilitate RF transmission. In one embodiment, the valve stem of the tire is used as the antenna 216. In the preferred embodiment, the RF stage 214 transmits radio signals to communicate data representative of the position information determined for the tire monitor, such as positioning of the tire monitor 200 on the right or left side of the vehicle. The RF stage 214 thus forms a position information radio transmitting circuit.

FIG. 3 is a block diagram showing one embodiment of the controller 202 of FIG. 2. The controller 202 is implemented in this embodiment as an application specific integrated circuit (ASIC). The ASIC includes a microprocessor core 302, a transponder interface 304, a shock sensor interface 306, an analog to digital converter 308, an amplifier 310, and a current source 312. The amplifier 310 and the current source form a pressure sensor interface. These devices are integrated in a single monolithic integrated circuit for reduced size, weight and power consumption.

The microprocessor core 302 may be any conventional microprocessor circuit. The microprocessor core 302 is preferably a conventional core circuit available for integration in the ASIC. Preferably, the microprocessor core 302 includes a memory circuit and a processor. The processor operates in response to data and instructions stored in the memory circuit. The memory circuit in turn includes read only memory storing control programs and data for the processor and read-write memory for storing operational data of the processor. Examples of memory usage for the memory circuit to be described below include a stored last moving or stationary decision, a motion decisions counter, a returned value of a moving or stationary subroutine, a motion status flag and the position information for the transmitting tire monitors of the vehicle.

The transponder interface 304 includes circuitry for detection of external activation of the transponder by a signal applied by a remote exciter and for modulation of a signal to communicate data to a remote detector from the tire monitor 200. In one embodiment, the transponder interface 304 is constructed and is operated in accordance with the disclosure of U.S. patent application Ser. No. 09/245,938 entitled "Method And Apparatus For A Remote Tire Pressure Monitoring System," filed Feb. 5, 1999, in the names of S. McClelland, et al., which application is commonly assigned to the assignee of the present application and is incorporated herein in its entirety by this reference. Other suitable transponder interface circuits may be substituted.

The shock sensor interface 306 is configured to provide the necessary control signals and detect the response signal from the shock sensors 210, 212. As noted above, the shock sensors 210, 212 in one embodiment detect acceleration in the form of an electrical charge output signal. The output signal is on the order of 1 mV/g. The shock sensor interface 306 receives this analog signal, amplifies and filters the signal and provides an amplified signal in response. The shock sensor interface 306 operates in response to control signals from the microprocessor core 302. Preferably, both shock sensors can share the same interface via multiplexing. The shock sensor interface will be described in greater detail below in conjunction with FIG. 4.

The ADC 308 receives analog signals and converts them to multiple-bit digital signals. The ADC 308 is preferably a conventional core circuit available for integration in the ASIC. In particular, the ADC 308 receives the amplified shock sensor signals from the shock sensor interface 306 and converts these to digital data. The ADC 308 provides the digital data to the microprocessor core 302 for further processing. The ADC 308 operates in response to control signals from the microprocessor core 302.

The amplifier 310 amplifies a pressure signal received from the pressure sensor 208. The amplifier 310 provides an amplified pressure signal 20 to the ADC 308. The ADC 308 in turn converts the analog pressure signal to digital data and provides the digital data to the microprocessor core 302 for further processing. The current source 312 provides a constant current to the pressure sensor 308 irrespective of possible fluctuations in supply voltage.

Figure 4:
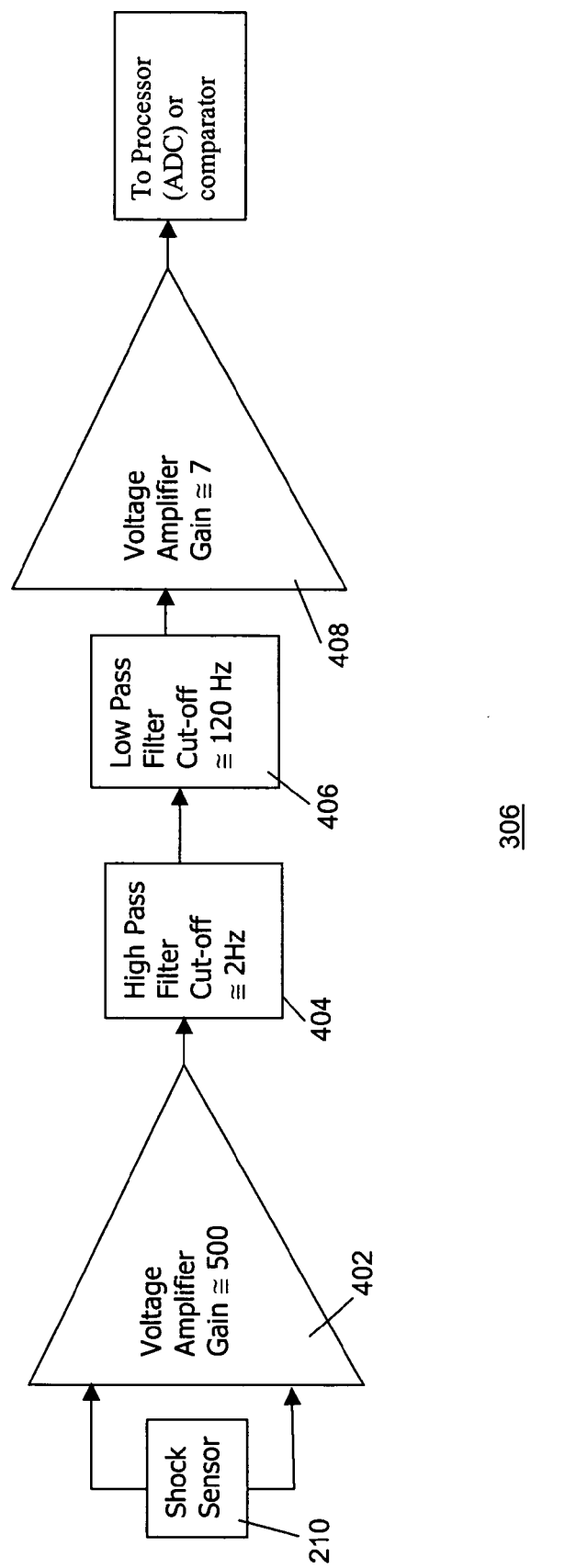
FIG. 4 is a block diagram of one embodiment of the shock sensor interface of FIG. 3.

FIG. 4 is a block diagram of one embodiment of the shock sensor interface 306 of FIG. 3. The shock sensor interface 306 includes a voltage amplifier 402, a high pass filter 404, a low pass filter 406 and a voltage amplifier 408. In other embodiments, additional components may be included or substituted to provide particular operational features or meet particular design goals.

As noted above, the two shock sensors preferably share a common shock sensor interface. The input signals from the shock sensors are multiplexed using a suitable control circuit under control of, for example, the microprocessor core 302 (FIG. 3). In this manner, only a single implementation of the shock sensor interface is required, reducing the physical size and power dissipation requirements of the tire monitor. By multiplexing, first one shock sensor input signal is coupled to the shock sensor interface for amplification and filtering during a first time period. Subsequently, during a second time period, the second shock sensor input signal is coupled to the shock sensor interface.

The voltage amplifier 402 has a differential input coupled to the two nodes of a shock sensor such as the shock sensor 210. Because the output signal from the shock sensor is very small in amplitude, the shock sensor interface 306 provides substantial gain to this signal for reliable detection and subsequent processing in the controller 202. The voltage amplifier 402 in the illustrated embodiment provides a substantial portion of this gain. The voltage amplifier 402 is set to have voltage gain of approximately 500. The voltage amplifier 402 also provides differential to single-ended conversion. Any suitable amplifier circuit, such as an operational amplifier integrated circuit, may be used to implement the voltage amplifier 402.

The high pass filter 404 and the low pass filter 406 operate to filter the amplified signal from the voltage amplifier 402 and to limit the bandwidth of the signal produced by the shock sensor interface 306. In the illustrated embodiment, the high pass filter has a cut off frequency of approximately 2 Hz and the low pass filter has a cut off frequency of approximately 120 Hz. Other cut off frequencies may be chosen for particular implementations. Alternatively, the two filters 404, 406 could be combined in a single bandpass filter.

The voltage amplifier 408 provides a final stage of voltage amplification. In the exemplary embodiment of FIG. 4, this amplifier 408 has a voltage gain of substantially 7. Other gain values may be chosen. Also, any suitable amplifier design may be used to provide the output signal from the shock sensor interface 306.

Figure 5:
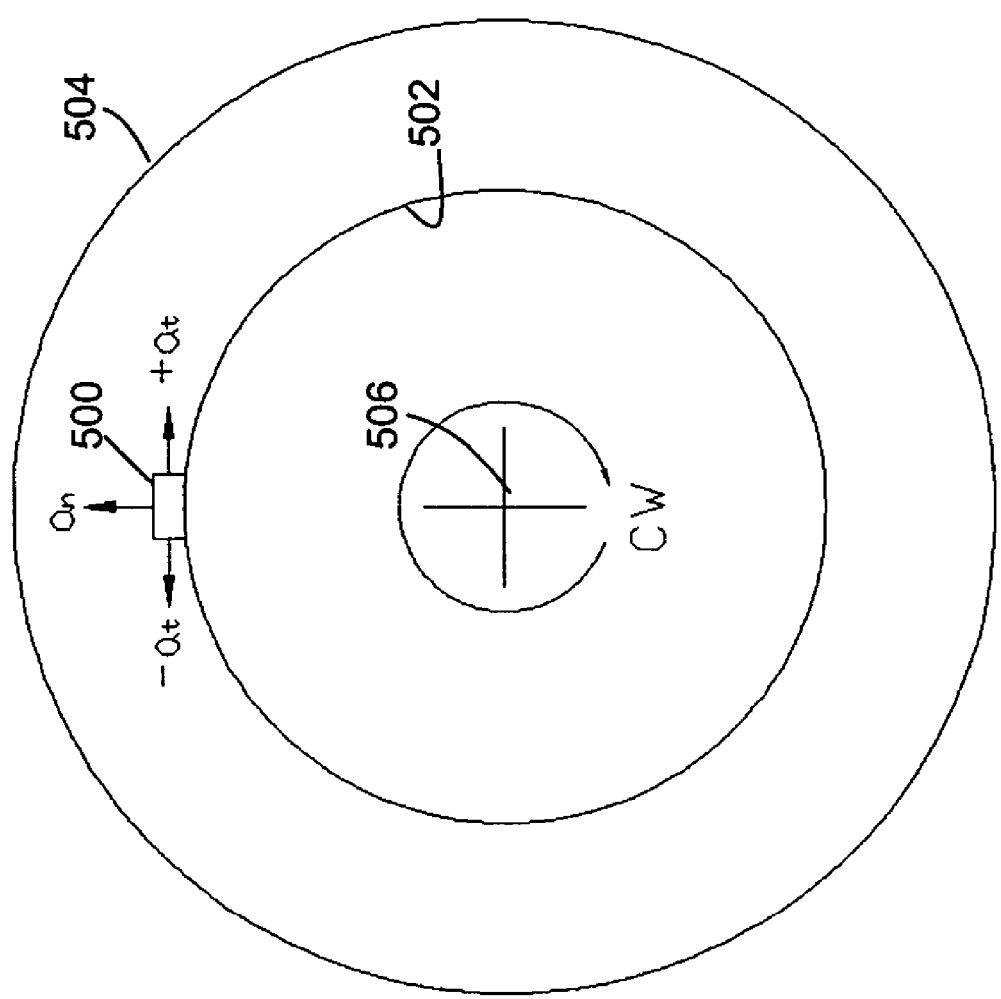
FIGS. 5-9 illustrate acceleration experienced by the tire monitor of FIG. 2.

FIG. 5 illustrates acceleration experienced by a tire monitor such as the tire monitor 200 of FIG. 2. FIG. 5 illustrates a tire monitor 200 mounted on a wheel 502 associated with a tire 504. The wheel 502 and tire 504 spin about a hub 506 in either a clockwise direction or a counterclockwise direction. Rotation in the clockwise (CW) direction is illustrated in FIG. 5. As is further illustrated in FIG. 5, the tire monitor 500 experiences two types of acceleration during rotation of the tire. Centrifugal acceleration $a_n$ which may be encountered by a tire monitor or dependent on the maximum vehicle speed and the tire and rim combination used. The required turn on speed for the tire monitor in one exemplary embodiment, indicating when the tire monitor determines that it should change state, is when the vehicle has reached a speed of approximately 15 miles per hour. Other turn on speeds may be used as well. The forces seen by the tire monitor at this speed can vary. Empirically, an accelerometer force of 2G, or twice the acceleration due to gravity, is specified. The maximum acceleration seen by the tire monitor 500 will occur in certain high speed automobiles which can achieve speeds of 200 miles per hour or more, corresponding to a centrifugal acceleration $a_n$ of 1800G at the tire monitor.

As is further illustrated in FIG. 5, the tire monitor 500 also experiences tangential acceleration $a_t$. The tangential acceleration experienced by the tire monitor is, in contrast to centrifugal acceleration $a_n$, very small in magnitude. Exemplary values are fractions of a g force. Also, such tangential acceleration may last for only short durations.

Figure 6:
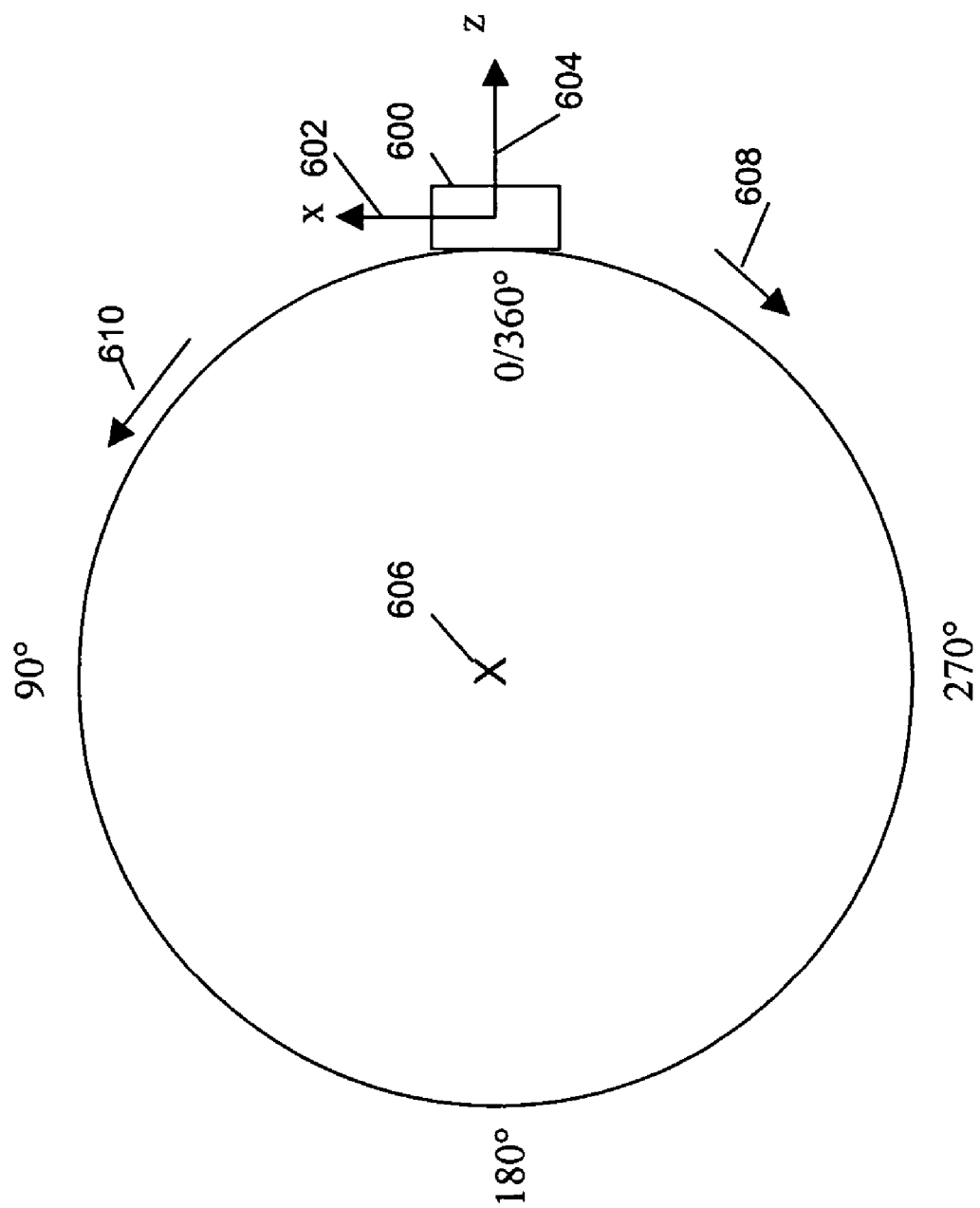

FIG. 6 further illustrates acceleration in a tire monitor 600 such as the tire monitor 200 of FIG. 2. The tire monitor 600 includes a pair of shock sensors such as the shock sensors 210, 212 of FIG. 2 which, in this embodiment, are positioned in the tire monitor on the wheel so as to be sensitive to acceleration along two orthogonal axes. As shown in FIG. 6, these include an x axis 602 and a z axis 604. The shock sensors, in conjunction with the tire monitor 600 rotate about the center 606 of the wheel on which the tire monitor 600 is mounted. A y axis extends through the center 606, perpendicular to the plane of the page and orthogonal to the x axis 602 and the z axis 604. As the wheel turns, the tire monitor 600 moves in one of a clockwise direction 608 and a counterclockwise direction 610.

Figure 7:
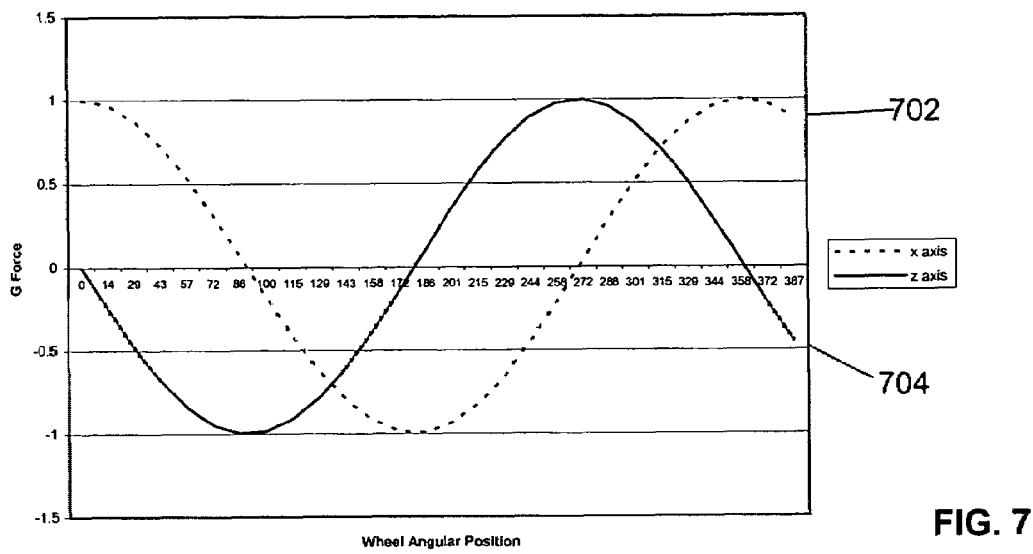
Figure 8:
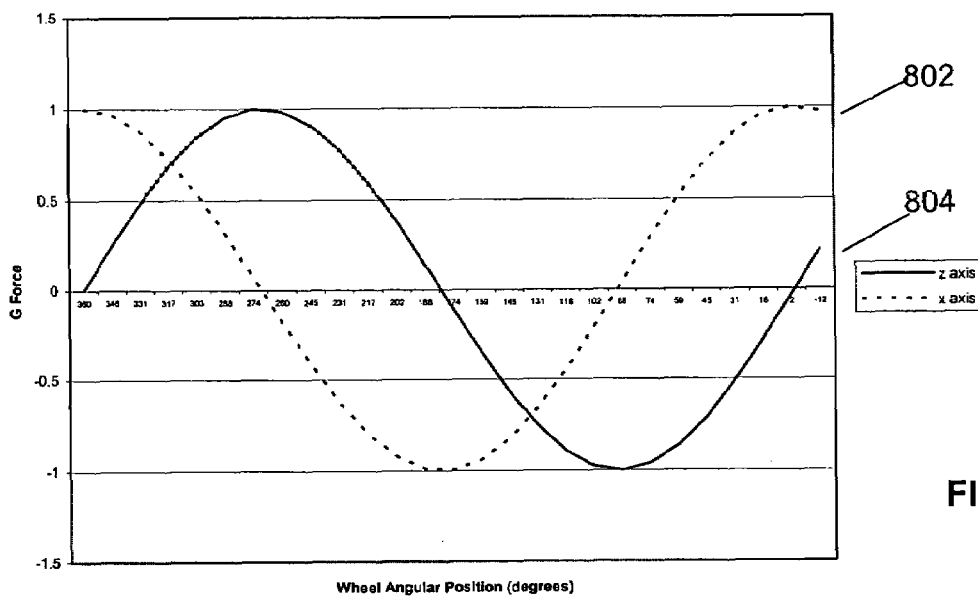

In this embodiment, the shock sensors are positioned in the tire monitor 600 with sensitive axes oriented as shown in FIG. 6. As the vehicle moves forward, the tire monitor 600 and the two perpendicular axes of the accelerometer will rotate around the y axis or wheel axis at the wheel center 606. In the embodiment, each output signal of the shock sensors, one output per axis, will produce a sine wave. This sine wave describes acceleration due to gravity plus the centrifugal or tangential acceleration components. The two sine waves are illustrated in FIGS. 7 and 8. The dual shock sensors will produce first and second axis acceleration signals having a sine wave characteristic such as that illustrated in the drawing figures.

FIG. 7 is a diagram showing acceleration or G force versus wheel angular position when the wheel is moving in a counterclockwise (CCW) direction. FIG. 7 shows acceleration along the x axis 702 and the z axis 704. Similarly, FIG. 8 shows acceleration or G force versus wheel angular position when the wheel is moving in a clockwise (CW) direction. FIG. 8 shows acceleration along the x axis 802 and acceleration along the z axis 804. In both FIG. 7 and FIG. 8, the maximum acceleration detected by the shock sensor is approximately plus or minus 1 g or 1 times the acceleration due to gravity. As noted above, in typical applications, the actual acceleration experienced in a moving wheel may be much larger or much smaller than this amount.

From FIG. 7 and FIG. 8, it can be seen that, as the wheel rotates, the two waveforms produced by the shock sensor are out of phase by 90 degrees. Depending on the direction of rotation of the wheel, clockwise or counterclockwise, one axis will lead or lag the other axis. Thus, in FIG. 7, showing rotation in a counterclockwise direction, acceleration along the z axis 704 leads acceleration along the x axis by approximately 90 degrees. Similarly, in FIG. 8, acceleration along the x axis 802 leads the acceleration along the z axis 804 by approximately 90 degrees.

In the illustrated embodiment, the shock sensors convert the acceleration they detect into signals such as voltage waveforms. These signals, including a first signal for acceleration on one axis and a second signal for acceleration on a second axis, can then be amplified, filtered and converted to digital data by the controller of the tire monitor. Position information about position of a tire including the tire monitor can then be determined based on the signal. A decision can subsequently be made as to whether the tire monitor is rotating in a clockwise or counterclockwise direction, based on the sampled signal from the shock sensor. The position information, such as right hand side positioning or left hand side positioning can be determined from the direction of rotation.

For example, the controller of the tire monitor can determine a lag/lead relationship of the first acceleration signal for the x axis and the second acceleration signal of the z axis. The controller determines whether the x axis signal leads or lags the z axis signal. This lag/lead information will indicate either clockwise or counterclockwise rotation for the wheel or tire associated with the tire monitor. Based on the clockwise or counterclockwise rotation information, and information that the vehicle is traveling forward rather than backing up, the controller can determine whether the tire monitor is on the right-hand side or the left-hand side of the vehicle. For directional rotation, the disclosed method and apparatus look at the alternating +1 g/−1 g component. Accordingly, FIGS. 7 and 8 do not illustrate all acceleration components seen at the output of the z axis shock sensor but are representative of the alternating component. Operation of the tire monitor will be described in greater detail below in conjunction with FIGS. 10-12.

Substituting the shock sensors for accelerometers in a tire monitor substantially simplifies the design of the tire monitor. Since the accelerometer output is proportional to the absolute force applied to it, then the accelerometer operating in the radial plane of the wheel is subject to the presence of increasing centrifugal force as the speed of the wheel increases. This is an undesired effect in the prior art since the force that is required to be detected is the variance of the ±1 g gravitational force as the wheel rotates. This means that the changing effect of the centrifugal force has to be negated, which makes the design using accelerometers more complex. Since the shock sensor only outputs a voltage proportional to a change in force applied, then the steady or very slowly changing offset created by centrifugal force is not sensed by the shock sensor at all. Detection of this voltage in the tire monitor is relatively simple.

Figure 9:
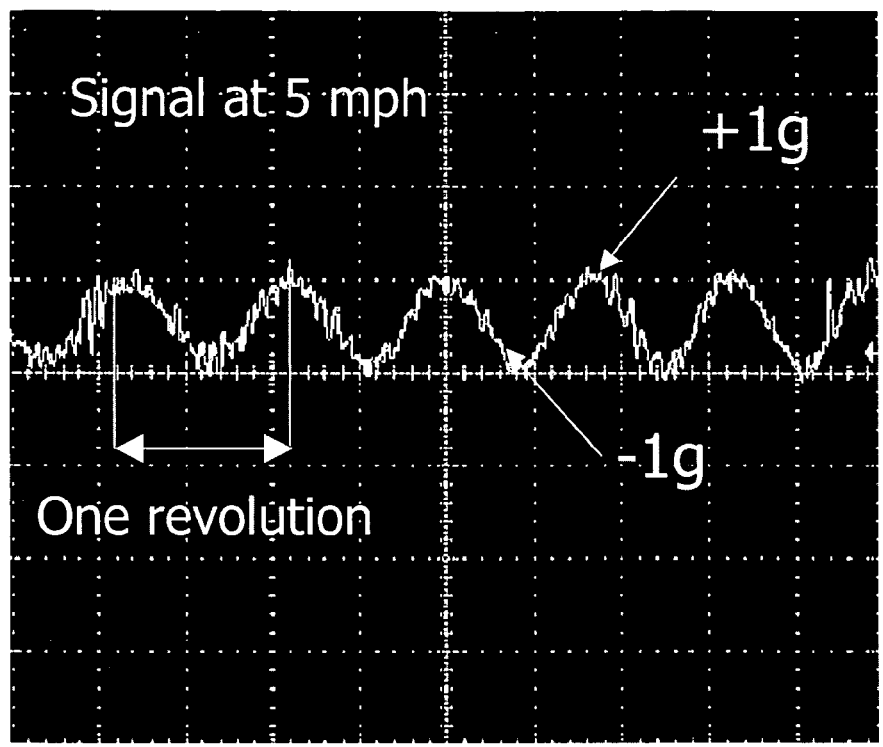

FIG. 9 shows the output signal from a shock sensor. FIG. 9(*a*) shows the shock sensor output signal when a vehicle equipped with the shock sensor mounted on a wheel is moving so that the wheel is rotating. The output signal is a sinusoid with a period equal to one revolution of the wheel. The magnitude of the output signal is a voltage proportional to the acceleration experienced by the shock sensor as it rotates, one g or one times the acceleration due to gravity. Thus, the voltage peaks correspond to ±1 g. As noted above, a typical shock sensor has an output voltage proportional to acceleration of approximately 1 mV/g. The signal shown in FIG. 9(*a*) is a sinusoidal output signal proportional to gravitational acceleration. This signal can be amplified and filtered for detection by the tire monitor.

FIG. 9(*b*) and FIG. 9(*c*) show the natural resonant frequency output signal from the shock sensor. FIG. 9(*b*) shows the signal when the vehicle is stationary. The signal is substantially noise. There is no resonance component when the vehicle with the shock sensor is stationary and experiences no acceleration. When stationary, there is no output signal from the shock sensor. FIG. 9(*c*) shows the signal when the vehicle and the shock sensor are in motion. Due to the acceleration associated with motion of road noise and vibration, the signal displays the natural resonance frequency of approximately 27 KHz. The signal illustrated in FIGS. 9(*b*) and 9(*c*) is a resonant signal due to motion or acceleration of the shock sensor. The filter of the of the shock sensor interface may be arranged to detect wide band noise, rather than specifically detecting the resonance frequency.

FIG. 9 thus illustrates two possible methods for motion detection in a tire monitor equipped with a shock sensor. In the first method suggested by FIG. 9(*a*), the sinusoidal output signal proportional to gravitational acceleration provides an indication of vehicle motion. The tire monitor samples this signal at a frequency greater than the frequency of the sinusoid and detects the periodic nature of the signal. If the periodic signal is absent from the shock sensor output signal, the tire monitor concludes that the vehicle is at rest. If the periodic signal is present in the shock sensor output signal, the tire monitor concludes that the vehicle is in motion.

In the second method suggested by FIGS. 9(*b*) and 9(*c*), the resonant signal due to motion or acceleration of the shock sensor provides an indication of vehicle motion. The resonant signal is a wideband noise signal produced by the shock sensor when the shock sensor is subject to non-zero force. If the resonant signal is absent from the shock sensor output signal, the tire monitor concludes that the vehicle is at rest. If the resonant signal is present in the shock sensor output signal, the tire monitor concludes that the vehicle is in motion.

In the embodiment of FIG. 3, the shock sensor interface 306 detects the shock sensor output signal, which may be considered a motion signal indicative of motion of the tire monitor and the vehicle on which the tire monitor is mounted. The shock sensor interface 306 amplifies and filters the shock sensor output signal and provides an analog shock sensor signal to the analog to digital converter 308. Amplification may be by any suitable amount, even unity. The ADC 308 converts the analog shock sensor signal to digital shock sensor data and provides the data to the microprocessor core 302. This data may be considered motion data. The relative value of the motion data may be interpreted as an indication that the vehicle is in motion or is stationary.

Alternatively, wideband noise due to acceleration of the shock sensor is detected to determine if the vehicle and tire monitor are in motion. The filters 404, 406 of the shock sensor interface circuit 306 are set up to detect wideband noise. The shock sensors provide a wideband noise signal when in motion. This signal is absent when the shock sensors are stationary and not subject to any forces.

The microprocessor core 302 determines a motion condition of the vehicle, such as if the vehicle is in motion or stationary, by sampling the shock sensor data and drawing a conclusion based on the value of the shock sensor data. This may be done in the microprocessor core 302 by comparing the value of the shock sensor data or motion data with a stored threshold. If the motion data exceeds the threshold, the magnitude of the motion signal corresponds to a detection of motion by the shock sensor and the microprocessor core concludes the tire monitor and vehicle are in motion. On the other hand, if the motion data does not exceed the threshold, the microprocessor core concludes the tire monitor and vehicle are stationary.

Thus, use of a shock sensor as a motion switch in a tire monitor permits replacement of the expensive mechanical ball and spring roll switch of previous generation tire monitors. The mechanical roll switch is often unreliable and is expensive and increases current dissipation and reduces battery life in the tire monitor. Also, the mechanical roll switch is not surface-mountable and so has to be manually assembled to a printed circuit board. Use of a roll switch in a design requires expensive assembly equipment for placement and soldering of roll switch devices on printed circuit boards. The shock sensor, used as a motion switch, uses no current and therefore prolongs battery life. Typical shock sensor cost is about half the cost of a mechanical roll switch, thereby reducing the parts cost of the tire monitor. Since the shock sensor is a solid state piezoelectric device with no moving parts, the shock sensor is more durable, which is important in the harsh tire monitor environment. Further, the shock sensor may be mounted to the surface of a printed circuit board with other components of the tire monitor and is therefore compatible with conventional electronic manufacturing techniques.

In an alternative embodiment, a slightly different shock sensor design is used in the tire monitor. In one aspect of the embodiment described above in conjunction with FIGS. 2-9, two different shock sensor models are used for the two shock sensors 210, 210. The two shock sensors are mounted 90 degrees apart, in alignment with the orthogonal x and z axes illustrated in FIG. 6. Using currently commercially available devices, this requires two different shock sensor parts. For example, Murata, Inc. sells shock sensor part numbers PKGS 00RA (0 degree part) and a PKGS 90RA (90 degree part). The difference between these two parts is that the piezoelectric material inside is mounted in the PKGS 00RA at 0 degrees to the horizontal and in the PKGS 90RA part at 90 degrees to the horizontal. This gives a 90 degree lead or lag in their outputs, depending in which direction the vehicle is traveling, as illustrated in FIGS. 7 and 8.

Other shock sensor models are available that provide important manufacturing and cost reduction benefits. For example, as well as making a 0 degree part and a 90 degree part Murata, Inc. also make a 25 degree part, PKGS 25RA. This means that in this part, the piezoelectric material is internally mounted at 25 degrees to the horizontal. In the alternative embodiment, two of these 25 degree shock sensors are installed in the tire monitor. One 25 degree shock sensor is mounted on the tire monitor printed circuit board and the other shock sensor part is mounted on the printed circuit board oriented at 180 degrees relative to the first shock sensor. This positioning effectively means that the two shock sensor output signals are 50 degrees out of phase, not 90 as in the embodiment described above. Any other angle specification for the shock sensor may be specified so long as a detectable signal is produced.

This provides a benefit during production line assembly in a factory since all the shock sensors being mounted to tire monitor printed circuit boards are identical. In contrast, when using two of the same shock sensor eliminates the need for special handling. All shock sensor parts can be handled commonly. This reduces manufacturing costs and manufacturing errors and improves manufacturing throughput.

Figure 10:
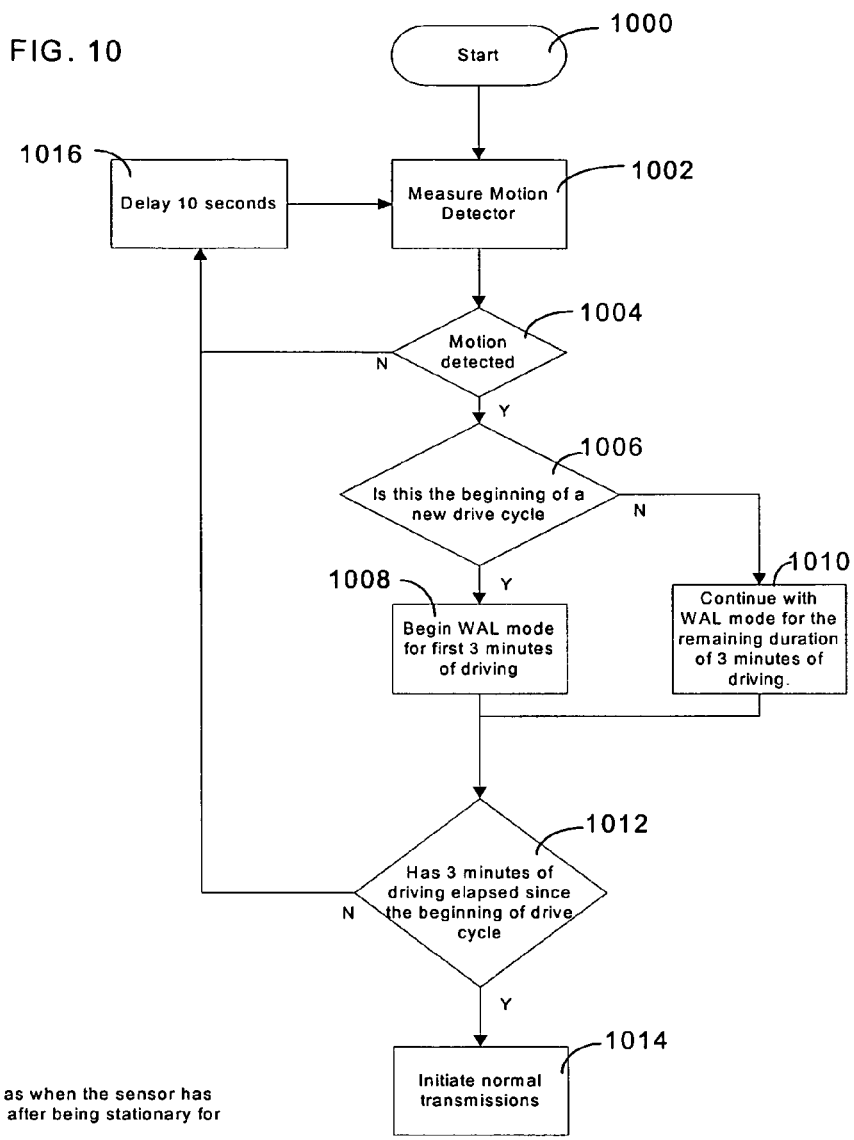
FIG. 10 is a flow diagram illustrating general operation of the tire monitor of FIG. 2.

FIG. 10 is a flow diagram illustrating general operation of the tire monitor of FIG. 1. In accordance with the presently disclosed embodiments, the tire monitor operates in one of several operating modes. One mode is normal mode, in which the tire monitor periodically measures a tire characteristic such as tire pressure and, if appropriate, transmits a radio frequency (RF) transmission to convey tire data to a remote receiver. Normal mode is generally entered only periodically and for the most part, the tire monitor remains in a sleep mode, in which most of the operating circuitry of the tire monitor is powered down to conserve energy in the battery which powers the tire monitor. At the beginning of operation, when the tire monitor detects that it has transitioned from a stationary condition, such as when the vehicle is parked, to motion, the tire monitor enters a wireless autolocation (WAL) mode in which the tire monitor system, aided by information determined and provided by the tire monitor, attempts to determine the position of all tire monitors on the vehicle. FIG. 10 illustrates this beginning operation. The method begins at block 1000. The method acts illustrated in FIG. 10 are preferably implemented by the controller 202 of a tire monitor 200 (FIG. 2) and in particular the method may be embodied as software program code and data stored in the memory circuit of the microprocessor core 302 and executed by the processor of the microprocessor core 302.

At block 1002, the controller measures the condition of the motion detector of the tire monitor to determine if the vehicle is in motion. In one embodiment, this is done by performing the method to be described below in conjunction with FIG. 15. In general, the controller measures the output signal of one of the shock sensors 210, 212 to determine if the vehicle is in motion.

At block 1004, a motion determination is made. The controller maintains a motion state for the tire monitor, which has two values. The motion state has a value of in-motion if the controller determines the tire monitor is in motion. The motion state has a stationary value if the controller determines the tire monitor is not in motion. The motion state may be stored by setting or resetting a flag or other logical value.

If, based on the shock sensor output signal, the controller determines the vehicle is not in motion, control proceeds to block 1016 to wait a predetermined time period, such as 10 seconds. The measurement of block 1002 is then repeated until the controller concludes the vehicle is in motion.

Upon a positive motion determination at block 1004, control proceeds to block 1006. At this block, the controller determines if this motion determination corresponds to the beginning of a new drive cycle. As noted in the note on FIG.

10, in one embodiment, a new drive cycle is defined as a return to an in-motion state after being in a stationary state for a predetermined time, such as 10 minutes. Any threshold may be used.

If the new in-motion state corresponds to a new drive cycle, at block 1008 the controller enters WAL mode for a predetermined time, such as three minutes. One example of processing in WAL mode is described below in conjunction with FIG. 20. Otherwise, if a new driving cycle has not begun, at block 1010, the controller remains in WAL mode for the predetermined duration. A timer may be set by the controller to track elapse of the predetermined duration. At block 1012, the time duration is tested. If 3 minutes or other time duration has not elapsed, control returns to block 1016 to wait for the delay time before measuring the motion detector again. If 3 minutes has elapsed, the tire monitor enters its normal mode at block 1014.

Figure 11:
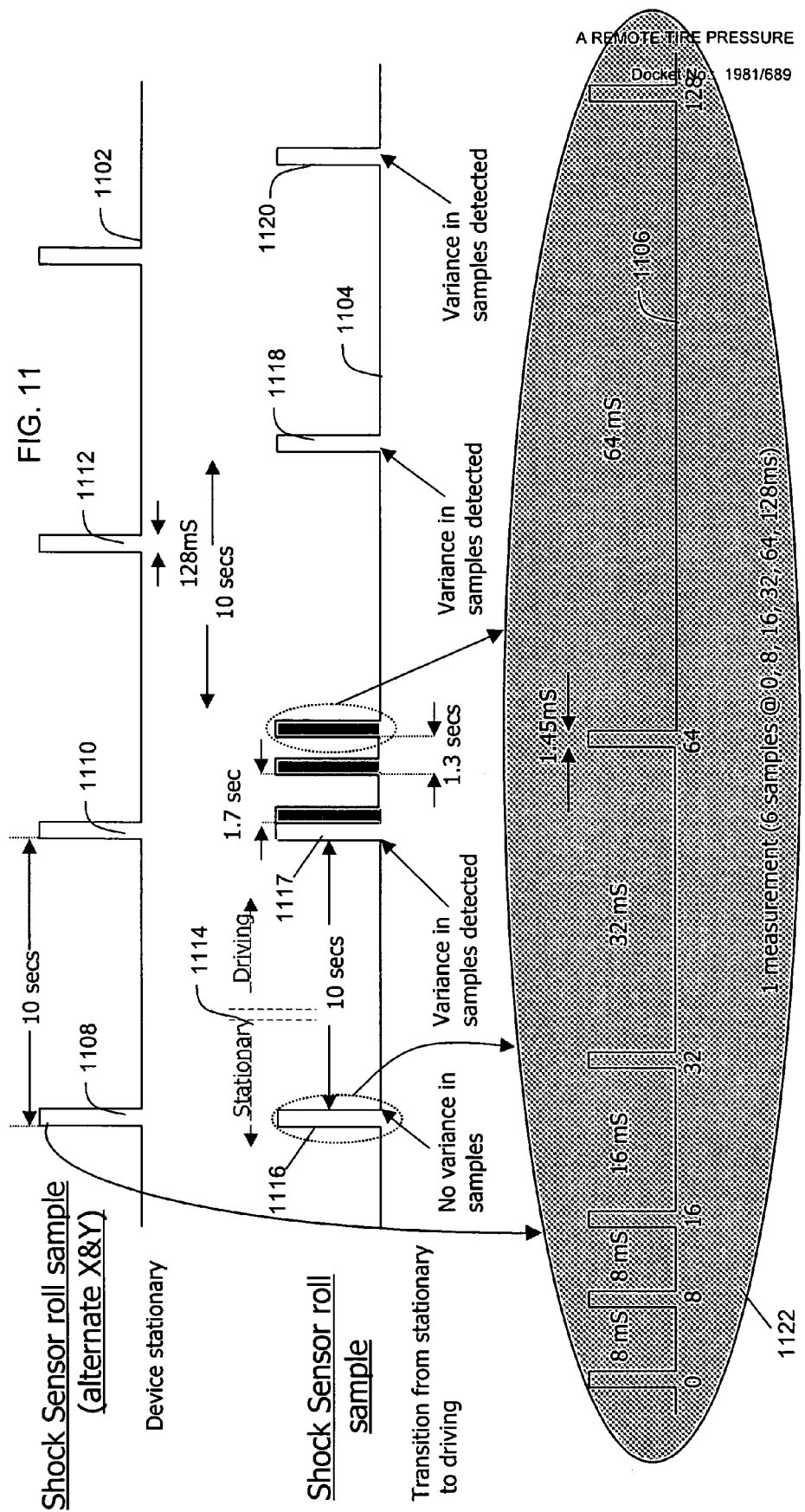
FIG. 11 is a timing diagram illustrating operation of the tire monitor of FIG. 2.

FIG. 11 is a timing diagram illustrating operation of the tire monitor controller for roll detection or motion detection. The processes illustrated in FIG. 11 and in the other diagrams which follow are exemplary only. Many methods may be devised for achieving the result described herein. Many optimizations and alterations may be made to the examples described herein. Such alterations are well within the purview of those ordinarily skilled in the art.

FIG. 11 shows three signals including signal 1102, signal 1104 and signal 1106. Each signal corresponds to activation of a shock sensor by the controller to determine if the tire monitor is in motion. During the times when the signals 1102, 1104, 1106 are at the logic low level, no measurement is made. During the times when the signals 1102, 1104, 1106 are high, a measurement is made. Thus the signals 1102, 1104, 1106 form a shock sensor roll sample.

Signal 1102 corresponds to operation when the device is stationary. Periodic shock sensor samples are taken as indicated by the state of the signal 1102. In the illustrated embodiment, if no motion is detected, a sample is taken every 10 seconds. Preferably, for wireless autolocation, the sample is taken using alternate shock sensors of the pair of shock sensors. Thus, during a first sampling period 1108, shock sensor X is sampled. Ten seconds later, during a second sampling period 1110, the other shock sensor, shock sensor Y is sampled. Ten seconds later, during third sampling period 1112, the first shock sensor, shock sensor X is again sampled. Each individual shock sensor is thus sampled every 20 seconds. For motion detection, preferably only one shock sensor is used. It is sampled once every 10 seconds in the exemplary embodiment described herein.

Sampling is achieved by providing the appropriate multiplexing signals to activate the sampling of the respective shock sensor. In the exemplary embodiment of FIG. 11, each sampling window has a duration of 128 ms.

Signal 1104 corresponds to operation when the device is transitioning from a stationary state to an in-motion state. In this example the motion state changes at time 1114. In the illustrated embodiment, if a change in motion is detected, the sample frequency changes. Thus, at time 1116, no motion is detected.

In this exemplary embodiment, during the sample taken at time 1117, variance in the samples is first detected. This detection is confirmed during the next three sampling periods. At time 1118, motion is confirmed by the variance in the samples from the shock sensors. Upon detection of a change in state, i.e., from stationary to in-motion or from in-motion to stationary, then three additional measurements are made to confirm the change of state. These three measurements are shaded in FIG. 1. The first measurement occurs substantially right after the measurement in which the variance is detected. The second measurement is made approximately 1.7 seconds after the beginning of the first measurement. The third measurement is made approximately 1.3 seconds after the beginning of the second measurement. The illustrated timing and number of measurements is exemplary only.

After completing the three confirmation samples, the controller returns to periodically sampling the state of the motion detector. After elapse of 10 seconds, a measurement is taken at time 1118. At this time, variance in the samples is detected so the controller concludes the tire monitor is still in motion. A subsequent measurement is made again at time 1120 with the same result. Since no change in motion state is detected, the three confirmation samples are not repeated.

Signal 1106 is a detailed view of one of the sampling intervals of signal 1102 or signal 1104. Signal 1106 illustrates that several individual measurements are made over a measurement time window 1122 to detect the state of the motion detector. In the exemplary embodiment of FIG. 1, a first measurement is made at the start of the measurement time window, at time 0 ms. Subsequent measurements are made at time 8 ms, 16 ms, 32 ms, 64 ms and 128 ms, at the end of the measurement time window 1122. Each measurement interval, when the selected shock sensor is actuated, is approximately 1.45 ms in duration. Other timing may be used as well.

Figure 12:
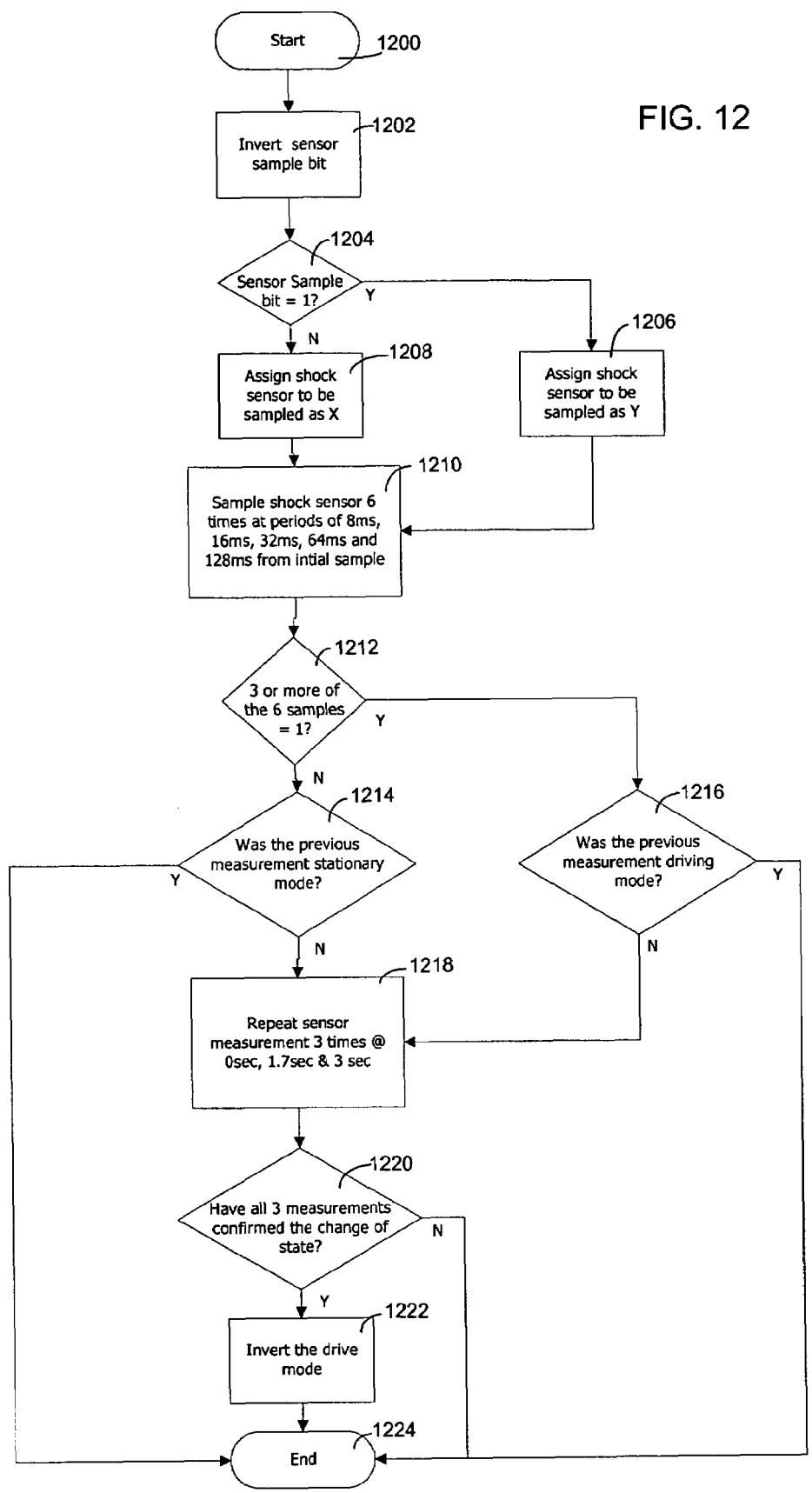
FIG. 12 is a flow diagram illustrating a motion detection method of the tire monitor of FIG. 2.

FIG. 12 is a flow diagram illustrating a motion detection method of the tire monitor of FIG. 2. The method acts of FIG. 12 may be performed by the controller of the tire monitor. In particular, the microprocessor of the controller may operate in response to data instructions stored in the controller to implement the method acts of FIG. 12. The method begins at block 1200.

At block 1202, the shock sensor bit is inverted. The shock sensor bit is a binary value that indicates which of the two shock sensors, designated shock sensor X and shock sensor Y, should be sampled. Sampling is performed by providing appropriate multiplexing signals to detect the signal produced by the sampled shock sensor. The sensor sample bit is stored at the controller of the tire monitor. At block 1204, the state of the data bit is tested. If the data bit has a binary 1 value, at block 1206 shock sensor Y is designated as the shock sensor to sample. Otherwise, at block 1208, shock sensor X is designated as the shock sensor to sample.

At block 1210, the shock sensor signal is sampled. In this example, the shock sensor is sampled a plurality of times. In the example of FIG. 12, the shock sensor signal is sampled over a window at times 0 ms, 8 ms, 16 ms, 32 ms, 64 ms and 128 ms. Other sampling may be used. The sampled values are digital data or are analog signal values that are converted to digital data and are stored. In this embodiment, a binary 1 value is produced if the shock sensor is in motion. Further, a binary 0 value is produced if the shock sensor is stationary.

At block 1212, the controller determines if a threshold condition is met. In the illustrated example, the controller determines if three or more of the six samples measured at block 1210 are equal to a binary 1 value. This can be treated as an indication that the tire monitor is now in motion. Other threshold conditions may be substituted. If the threshold condition is met, at block 1216 the controller determines if it had previously been determined that the tire monitor was in the in-motion state. If so, there has been no change of condition and the method ends at block 1224.

If the threshold condition is not met, this can be treated as an indication that the tire monitor is now stationary. At block 1214, the controller determines if it had previously been determined that the tire monitor was in the stationary state. If so, there has been no change of condition and the method ends at block 1224.

If at block 1214 the previous measurement indicated the stationary state or if at block 1216 the previous measurement indicated the in-motion state, at block 1218 the shock sensor value is detected three more times. In the illustrated embodiment, the timing of the three measurements is spaced by 0 seconds, 1.7 seconds and 3 seconds from the previous measurement. Other repeat measurement timing and patterns may be substituted.

At block 1220, the controller determines if all three repeat measurements confirm the change of state. This is done by comparing the current motion state value with the stored motion state value. If the change is not confirmed, the method ends at block 1224. If the change is confirmed at block 1220, the current mode is inverted. If the state had previously been in motion, the state is now set to stationary. If the state had previously been stationary, the state is now set to in-motion. Data defining the current motion state is stored for future reference.

After the controller of the tire monitor has determined that the tire monitor and vehicle are moving by using the motion detection function of the tire monitor with shock sensor, the tire monitor must next determine the relative phase of the signals from the shock sensors. The relative phase defines the lag-lead relationship between the signals and therefore the direction of rotation of the wheel, as described above in connection with FIGS. 7 and 8.

Figure 13:
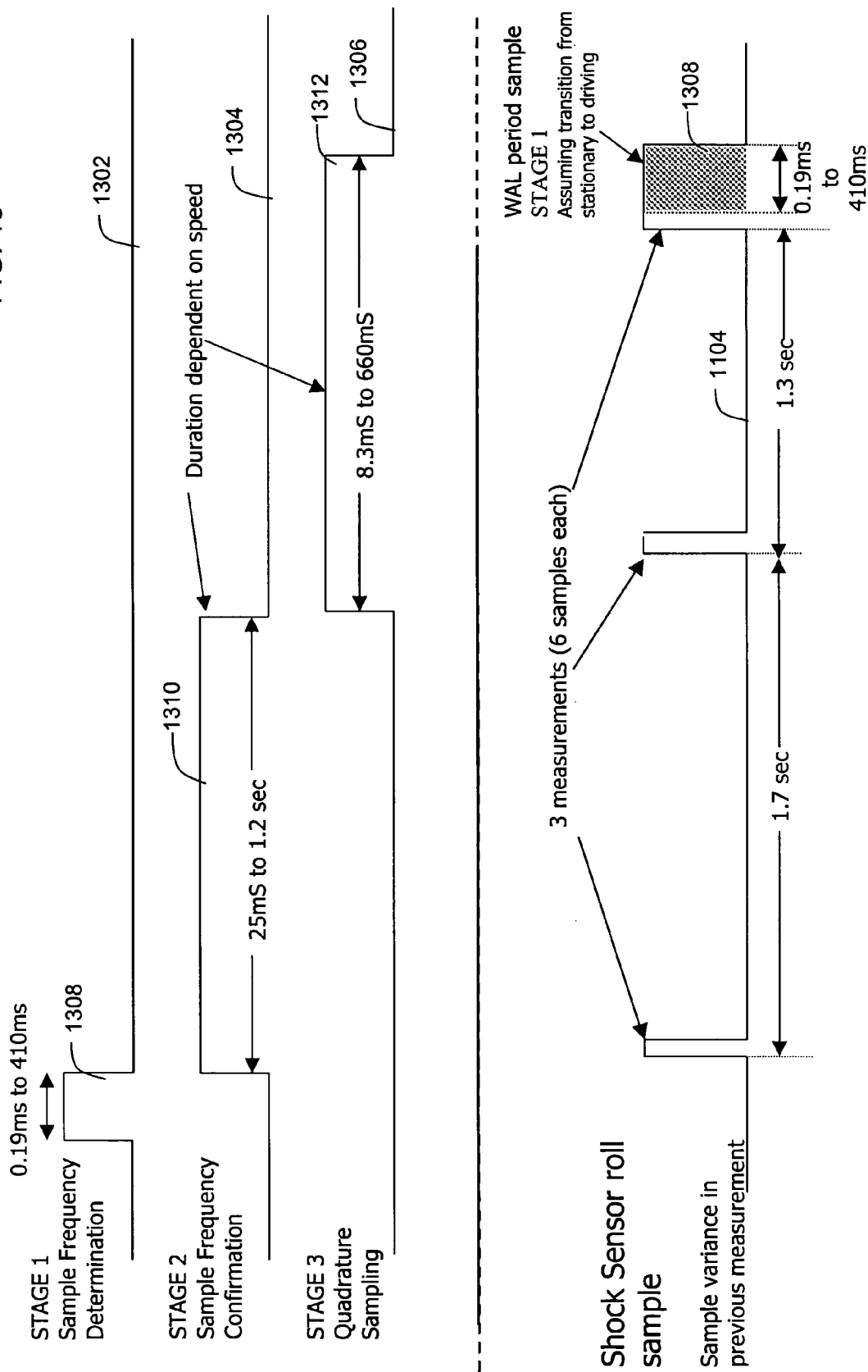
FIG. 13 is a timing diagram illustrating operation of the controller of the tire monitor of FIG. 2 for determining phase information for the two tire monitor signals.

FIG. 13 is a timing diagram illustrating operation of the controller of the tire monitor of FIG. 2 for determining phase information for the two tire monitor signals. FIG. 13 shows signals 1302, 1304 1306 that generally describe activity of the controller of a tire monitor during the phase detection process. The process includes three stages, as illustrated in the upper portion of FIG. 13.

Signal 1302 indicates operation during the first stage 1308 of the phase detection process. The first stage 1308 corresponds to determining a sample frequency, or the frequency at which the signal from the shock sensor should be sampled. The duration of the first stage 1308 of the phase detection process is variable, from 0.19 ms to 410 ms.

The lower portion of FIG. 13 illustrates how the first stage of the phase detection process is initiated. The lower portion of FIG. 13 shows the shock sensor roll sample signal 1104, which is active in the tire monitor when the tire monitor measures the state of one of its shock sensors. As described above in greater detail in connection with FIG. 11, upon detecting a variance in the shock sensor measurement, indicating a transition from stationary state to the in motion state, the tire monitor takes three measurements. As shown in the lower portion of FIG. 13 and in FIG. 11, each measurement includes six samples of the shock sensor output. The measurements are spaced by durations of 1.7 seconds and 1.3 seconds, respectively. Upon confirming the change of state from stationary to in motion, the first stage 1308 of the wireless autolocation routine begins.

Figure 14:
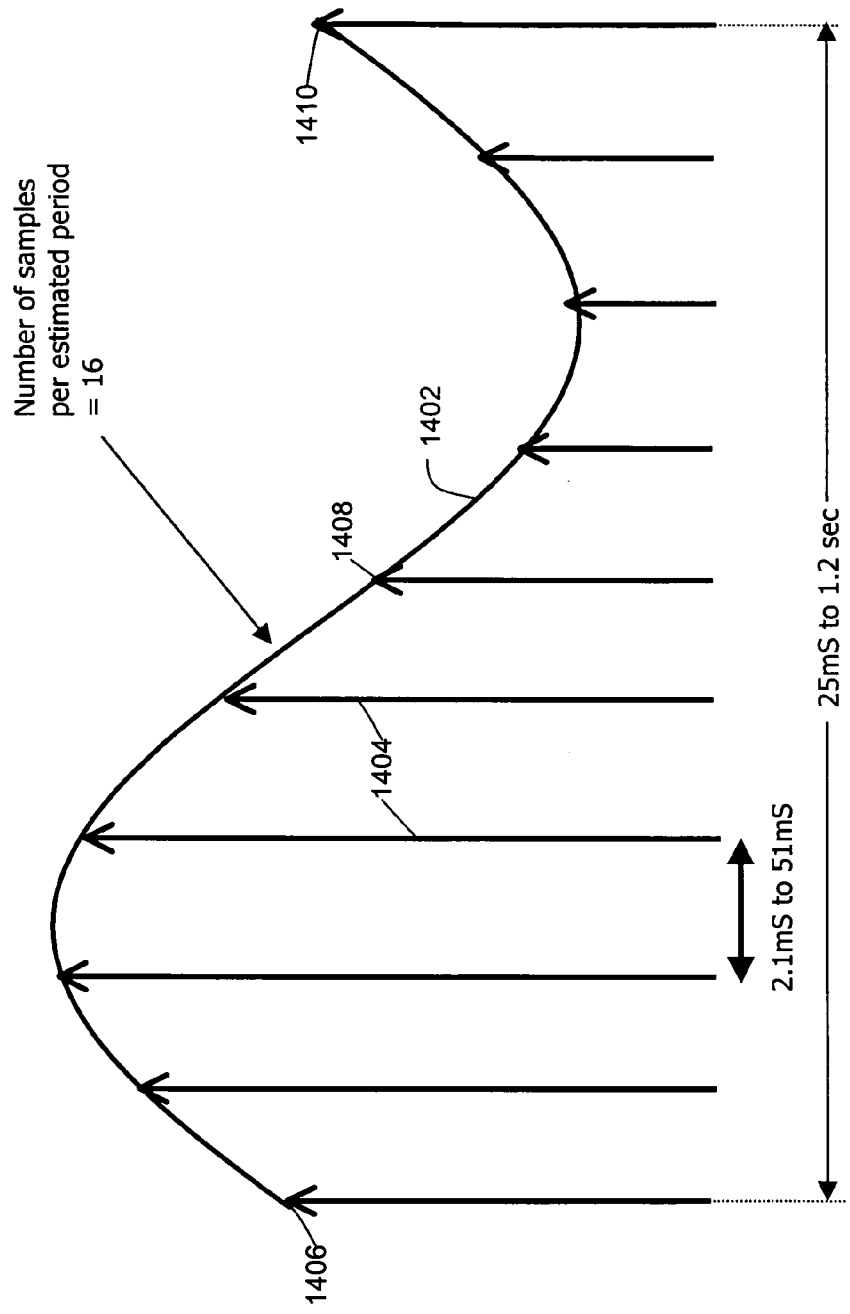
FIG. 14 illustrates one method of confirming a sampling frequency.

Signal 1304 indicates operation during the second stage 1310 of the phase detection process. This stage corresponds to confirming the sample frequency determined during the first stage 1308. FIG. 14 illustrates one method of confirming the sampling frequency. In FIG. 14, the output signal 1402 from one of the shock sensors is periodically sampled. As discussed above, during rotation of the wheel on which the tire monitor is mounted, the shock sensor experiences centrifugal acceleration which is periodic at the same frequency as the rotation of the wheel. As the wheel rotation speed increases, the frequency of the signal 1402 increases.

To confirm the sampling frequency, the tire monitor samples the signal 1402. In the exemplary embodiment of FIG. 14, the tire monitor samples the output signal 1402 sixteen times during a sampling period. The sampling period can have a duration from 25 ms to 1.2 sec. Using the sixteen samples, the tire monitor can approximate the shape of the signal 1402. The tire monitor determines an initial value at point 1406. When the signal 1402 has a value approximating the initial value, such as at point 1408, the tire monitor can assume that one-half period has elapsed. When the signal 1402 again has a value approximating the initial value, at point 1410, the tire monitor can assume that a full period has elapsed. The frequency can be confirmed based on this measured period. In alternative embodiments, the slope or first derivative of the signal 1402 can be determined as the ratio of the difference in measured values to the sampling period. The slope can be used to approximate peaks of the signal 1402. Other frequency or period measurement techniques may be used as well.

As is indicated in FIG. 13, the duration of the second stage 1310 is dependent on the relative speed of the vehicle. The tire monitor may require several cycles of the signal 1402 to reliably confirm the sampling frequency. At lower vehicle speeds, the period of the signal 1402 is longer so the duration of the second stage 1310 will be longer.

Referring again to FIG. 13, signal 1306 indicates operation during the third stage 1312 of the phase detection process. This stage 1312 corresponds to quadrature sampling of the signals from the two shock sensors of the tire monitor. As described above in connection with FIGS. 7 and 8, in one embodiment, the two shock sensor signals will be 90 degrees out of phase or in quadrature relationship to each other. The lag or lead relationship of the two signals may be used to determine the relative phase of the signals and thus the direction of rotation of the wheel. In other embodiments, 25 degree shock sensors or shock sensors with any set angle may be used, with suitable adjustment to signal processing.

Figure 15:
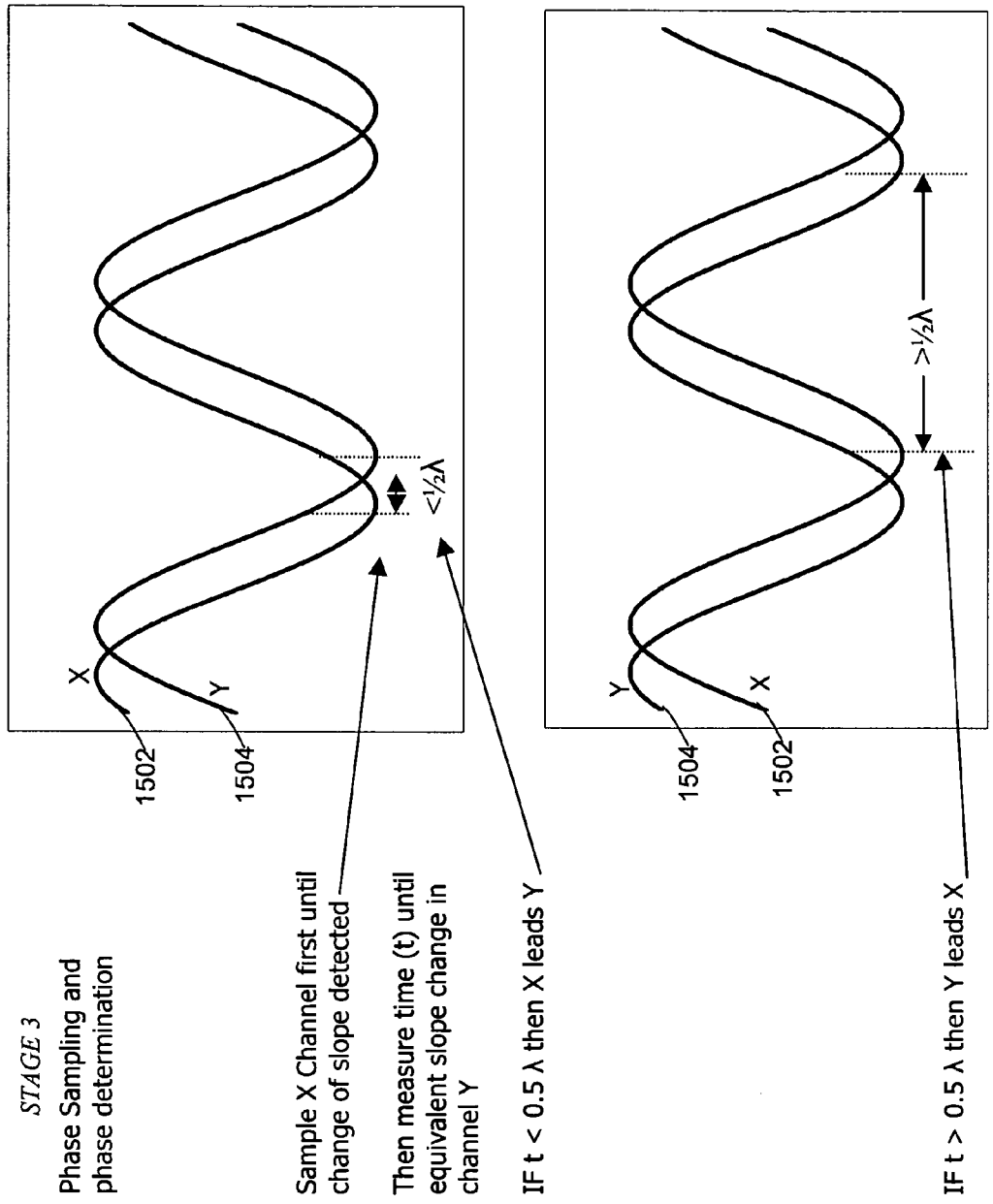
FIG. 15 illustrates phase determination by the tire monitor using two shock sensor signals.

FIG. 15 illustrates phase determination by the tire monitor using two shock sensor signals. FIG. 15 illustrates two shock sensor channel signals produced by the two shock sensors of a tire monitor, including X channel signal 1502 and Y channel signal 1504. The signals are shown as continuous and overlapping. However, as noted above, in some embodiments, the two signals 1502, 1504 are multiplexed so that the tire monitor samples them alternately or using some other discontinuous or periodic sampling.

In the illustrated embodiment, the tire monitor samples one channel such as the X channel signal 1502 first until a change in slope of the signal is located. This indicates a peak of the X channel signal 1502. Then, the tire monitor samples the Y channel signal 1504 until an equivalent slope change is determined in the Y channel signal 1504. The same slope change, either positive to negative slope or negative to positive slope, must be observed.

The tire monitor measures the time duration t between the slope changes of the X channel signal 1502 and the Y channel signal 1504. The time duration is then compared with the period of the two signals 1502, 1504, illustrated in FIG. 15 as $\lambda$. If $t<\lambda/2$, then the X channel signal 1502 leads the Y channel signal 1504. On the other hand, if $t>\lambda/2$, then the Y channel signal 1504 leads the X channel signal 1502. From this lag-lead relationship, the tire monitor can determine the direction of rotation of the wheel. From the rotation direction, the tire monitor can determine whether it is located on a right-side wheel of the vehicle or a left-side wheel of the vehicle.

In the embodiment of FIG. 15, the shock sensor channel signals are in quadrature relationship. Strict quadrature relationship requires a substantially 90 degree phase difference between the signals. In other embodiments, a quasi-quadrature relationship may be established and used to determine the lag-lead relationship between the shock sensor channel signals. For example, as described above, one manufacturer provides a 25 degree shock sensor in which the piezoelectric material is mounted at an angle 25 degrees to the horizontal. When two of these parts are used together, a 50 degree lag-lead relationship is established between the shock sensor channel signals. These signals thus have a quasi-quadrature relationship. The 50 degree difference is sufficient to resolve the lag-lead relationship between the signals and thus the direction of rotation of the wheel on which the tire monitor is mounted. The method described herein for true quadrature shock sensor channel signals can be readily extended to this or other examples.

Figure 16:
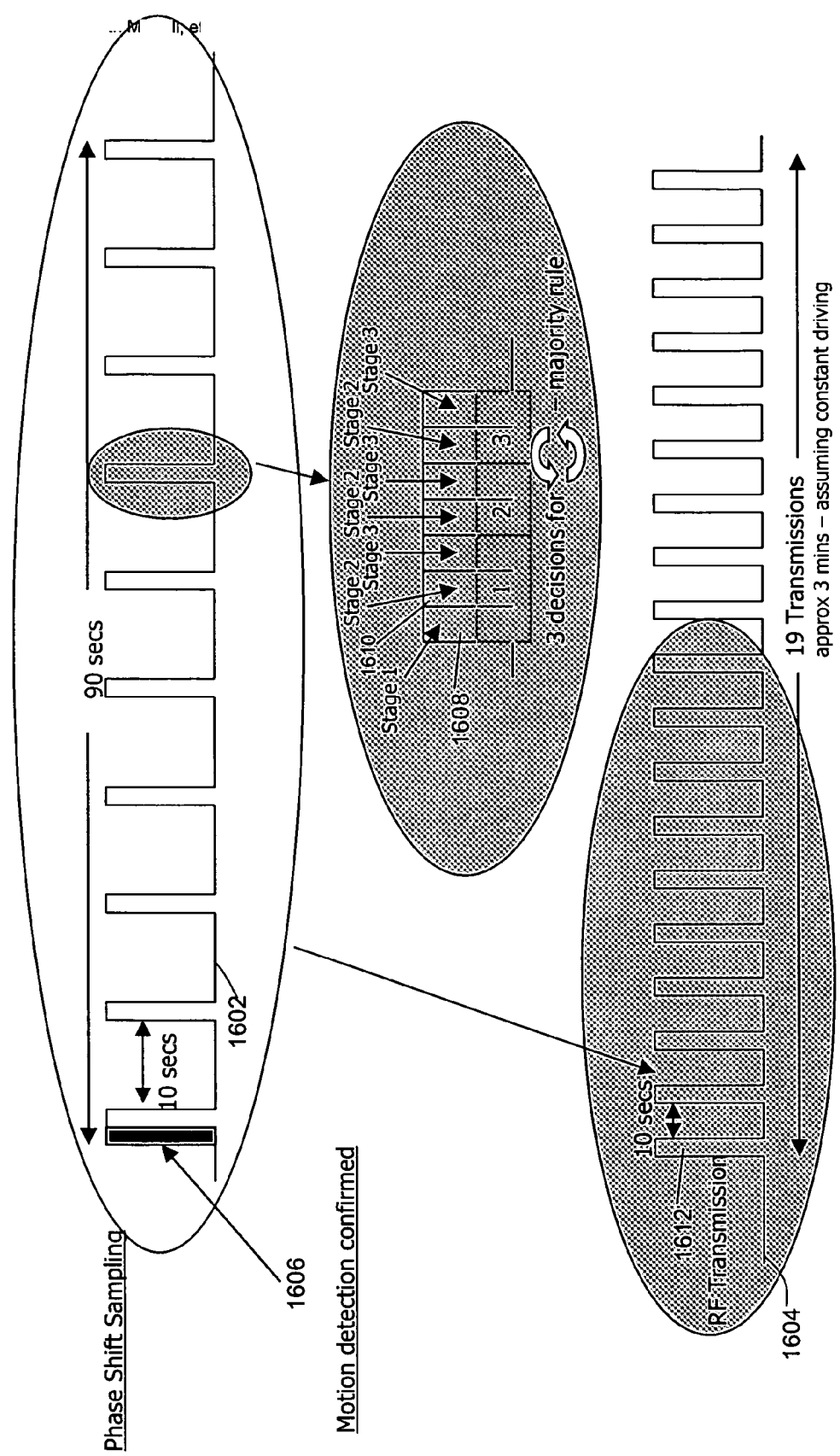
FIG. 16 is a timing diagram illustrating a wireless autolocation process for a tire monitor in a vehicle.

FIG. 16 is a timing diagram illustrating a wireless autolocation process for a tire monitor in a vehicle. The process illustrated in FIG. 16 will be described below in greater detail in conjunction with FIGS. 17-19. In FIG. 16, a signal 1602 illustrates activity of the tire monitor to sample shock sensor output signals provided by shock sensors of the tire monitor. Signal 1604 illustrates activity of the tire monitor to transmit data using the radio circuit of the tire monitor. The transmissions are intended for reception by a receiver of the vehicle on which the tire monitor is mounted.

The wireless autolocation process begins at a point 1606 when motion detection has been confirmed for the tire monitor. Prior to the point 1606, the shock sensors of the tire monitor have been used as motion detectors, to determine if the tire monitor is in the stationary state or if the tire monitor is in motion. Once motion is confirmed, for example as described herein, the wireless autolocation process begins. In the alternative, any other suitable motion detection device or routine may be used. For example, it may be appropriate in some applications to include a conventional roll switch to signal the transition from stationary state to in motion state.

In the illustrated embodiment, the wireless autolocation process involves nine rotation direction decision periods, each spaced approximately 10 seconds apart. Any suitable number of decision periods and any suitable time spacing may be used; the illustration of FIG. 16 is exemplary only.

As is illustrated in the inset of FIG. 16, the exemplary rotation direction decision period involves the first, second and third stages described above in conjunction with FIGS. 14-15. The decision period begins with a first stage process 1608, during which a process similar to that described above for estimating the sampling frequency is performed. Once the sampling frequency is estimated, a second stage process 1610 is performed to confirm the frequency estimate. If the estimate is confirmed, a third stage process is performed to make a decision about the direction of rotation.

Next, the second and third stages are performed a second time and then a third time. Each time, a decision about the direction of rotation is made until three decisions are available. The process of measuring nine samples and forming decisions each time takes approximately 90 seconds from the confirmation of motion detection at point 1606.

As illustrated in FIG. 16, a majority rule is used to form an ultimate decision about the rotation of direction of the wheel. One or more erroneous decisions may occur if the vehicle is temporarily traveling in reverse. The majority rule will cause such erroneous decisions to be discarded. Other numbers of repetitions of the decision process or other rules may be used and applied to similar result.

During this time, the tire monitor is periodically emitting radio frequency (RF) transmissions with appropriate data. A first RF transmission 1612 occurs upon confirmation of motion detection at point 1606. During the wireless autolocation (WAL) process, each WAL transmission includes, for example, mode definition data, tire data such as data defining tire pressure or tire temperature, tire monitor identification data and direction data defining the direction of rotation (clockwise or counterclockwise) as determined by the tire monitor. In the illustrated example, RF transmissions then occur approximately every 10 seconds. In this embodiment, 19 transmissions occur, requiring approximately 3 minutes. The tire monitor in one embodiment then enters a normal transmission mode in which the frequency of RF transmission is substantially reduced unless an extraordinary condition (such as sudden deflation) is detected and in which no direction data is transmitted. In other examples, the tire monitor continues making WAL transmissions, including the direction data.

Figure 17:
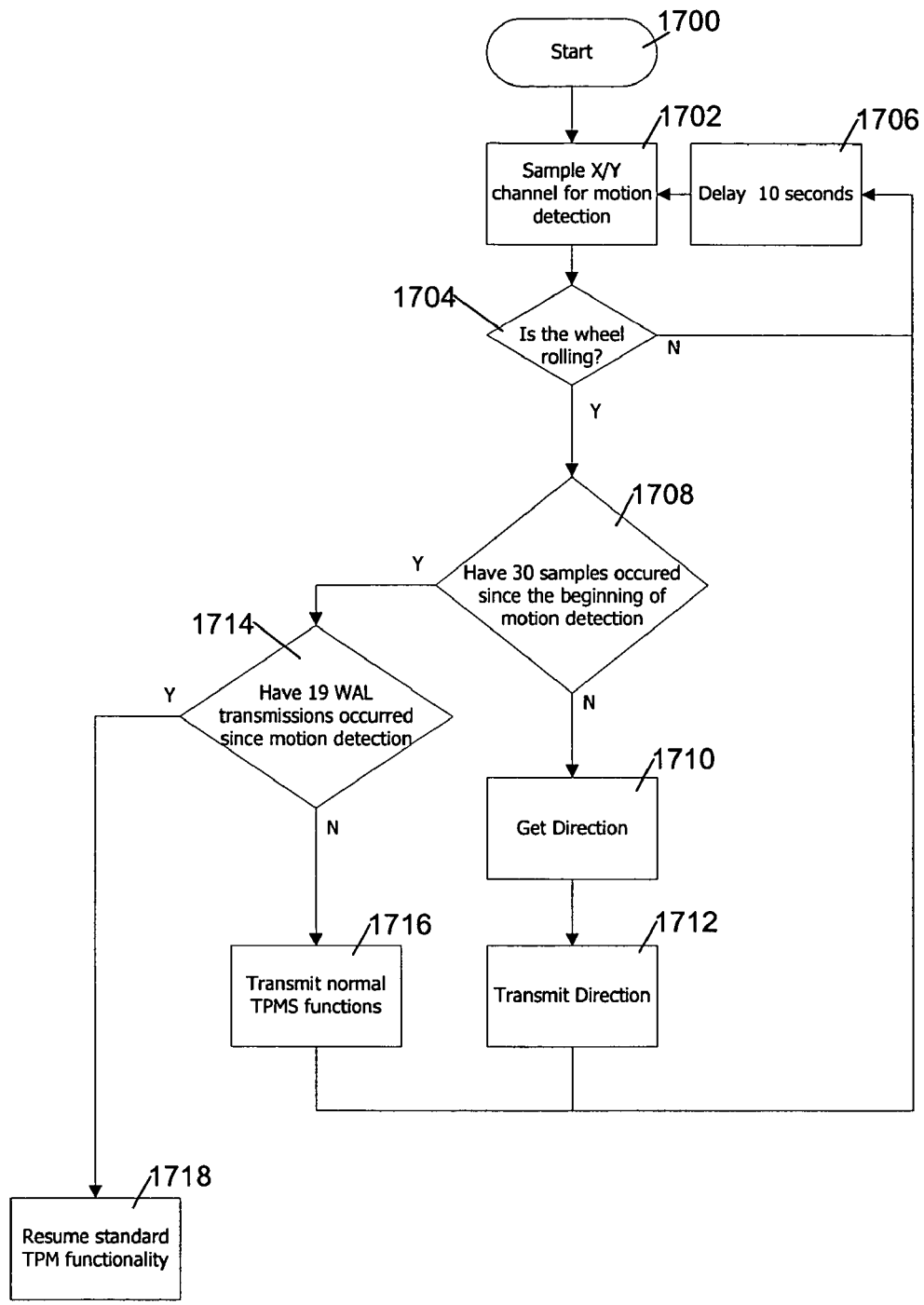
FIGS. 17-19 are flow diagrams illustrating the wireless autolocation process of FIG. 16.

FIG. 17 is a flow diagram illustrating one embodiment of a transmission strategy for a remote tire monitor. The illustrated embodiment may be particularly suitable for operation on vehicles in Europe. The method begins at block 1700. The actions illustrated in the flow diagram of FIGS. 17-19 may be performed in a control circuit by a processor or logic under software control by a computer program code stored in memory of the tire monitor. Additional steps necessary for complete operation of the system are omitted for clarity but will be apparent to those ordinarily skilled in the art.

At block 1702, the control circuit of the tire monitor samples the X channel and the Y channel to determine the condition of the shock sensor signals. One or both of the channels may be tested. The value determined gives an indication of the force exerted on the shock sensor and therefore the motion of the tire monitor and the wheel on which it is mounted. If the vehicle and the wheel are stationary, value from one value range will be returned. If the vehicle and the wheel are in motion above a certain speed, a value from another value range will be returned. The returned value can be used to determine the state of the tire monitor, either stationary or in motion.

At block 1704, the control circuit determines if the wheel is rolling, based on the value sampled at block 1702. If the wheel is not rolling, control proceeds to block 1706. The control circuit then waits a predetermined time, such as 10 seconds, and then loops back to block 1702 to again sample the X or Y shock sensor channels.

If the wheel is rolling at block 1704, at block 1708 the control circuit determines if a predetermined number of samples, such as 30 samples, have occurred since the beginning of motion detection. Any suitable threshold number may be used. If not, at block 1710 a procedure Get Direction is called to make a determination of the direction of rotation of the wheel. One example of the procedure Get Direction will be described below in conjunction with FIG. 18. After the direction is determined, at block 1712 the tire monitor under control of the control circuit transmits an RF transmission including data defining the determined direction. This may be referred to as a WAL transmission. Control then proceeds to block 1706 to await elapse of a 10 second period before again sampling the X and Y shock sensor samples.

If, at block 1708, 30 samples have occurred, control proceeds to block 1714. There, it is determined if 19 WAL transmissions have occurred since motion was detected by the tire monitor. If not, at block 1716, the tire monitor initiates a normal RF transmission, including mode data, tire monitor identifier and tire data. Control then proceeds to block 1706 to await elapse of a 10 second period before again sampling the X and Y shock sensor samples.

If, at block 1714, 19 WAL transmissions have occurred, control proceeds to block 1718. At this point, the wireless autolocation routine ends and the tire monitor begins its normal operation, transmitting tire data at conventional intervals.

Figure 18:
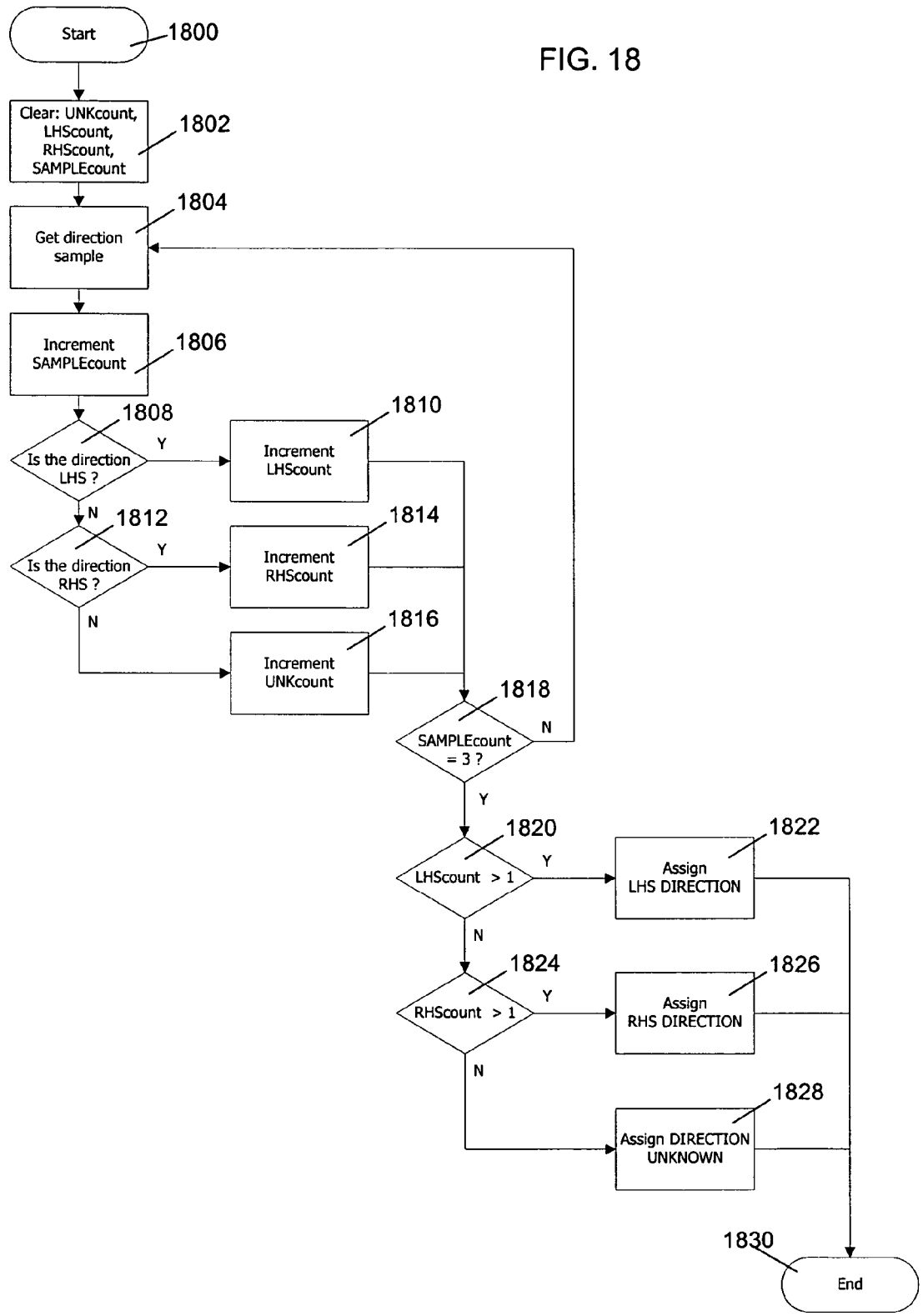

FIG. 18 illustrates one embodiment of the procedure Get Direction of FIG. 17. The procedure begins at block 1800. At block 1802, the control circuit clears the value of several variable used in the procedure, for example by resetting the variables to a zero value. In this embodiment, these variables are UNKcount, LHScount, RHScount and SAMPLEcount. At block 1804, the control circuit calls a procedure Get Direction Sample. One example of this procedure will be described below in conjunction with FIG. 19. This procedure returns an estimate of the direction of rotation of the wheel on which the tire monitor is mounted, or stated equivalently, and estimate of the side of the vehicle on which the tire monitor and wheel are mounted. Possible returned values are RHS for right hand side and LHS for left hand side. At block 1806, the control circuit increments the value of the variable SAMPLEcount.

At block 1808, the control circuit evaluates the value returned by the procedure Get Direction Sample. If the value corresponds to LHS, at block 1810 the control circuit increments the value of the variable LHScount. If not, and if at block 1812 the value corresponds to RHS, at block 1814 the control circuit increments the value of the variable RHScount. If neither value is returned or the returned value is not recognized, at block 1816 the control circuit increments the value of the variable UNKcount. In all cases, control proceeds to block 1818.

At block 1818, the control circuit tests the value of the variable SAMPLEcount. If this value equals 3, then three different direction samples have been evaluated and processing continues to block 1820. Otherwise, control returns to block 1804 where the procedure Get Direction Sample is called again. The threshold value or looping value 3 is arbitrary and is used to implement the majority rule for deciding rotation direction. Other values may be substituted.

Beginning at block 1820, the control circuit estimates the direction of rotation or the side of the vehicle on which the tire monitor is mounted. At block 1820, the control circuit tests the value of the variable LHScount. If LHScount is greater than 1, at block 1822 the output of the procedure is set to return the value LHS, indicating that the procedure has determined the tire monitor is located on the left hand side of the vehicle. If LHScount is not greater than 1, at block 1824 the control circuit tests the variable RHScount. If RHScount has a value greater than 1, at block 1826 the output of the procedure is set to return the value RHS, indicating that the procedure has determined the tire monitor is located on the right hand side of the vehicle. If RHScount is not greater than 1, at block 1828 the output of the procedure is set to return the value UNKNOWN indicating that the procedure can not reliable determine the rotation direction or the side of the vehicle on which is mounted the tire monitor. The procedure ends at block 1830.

Figure 19:
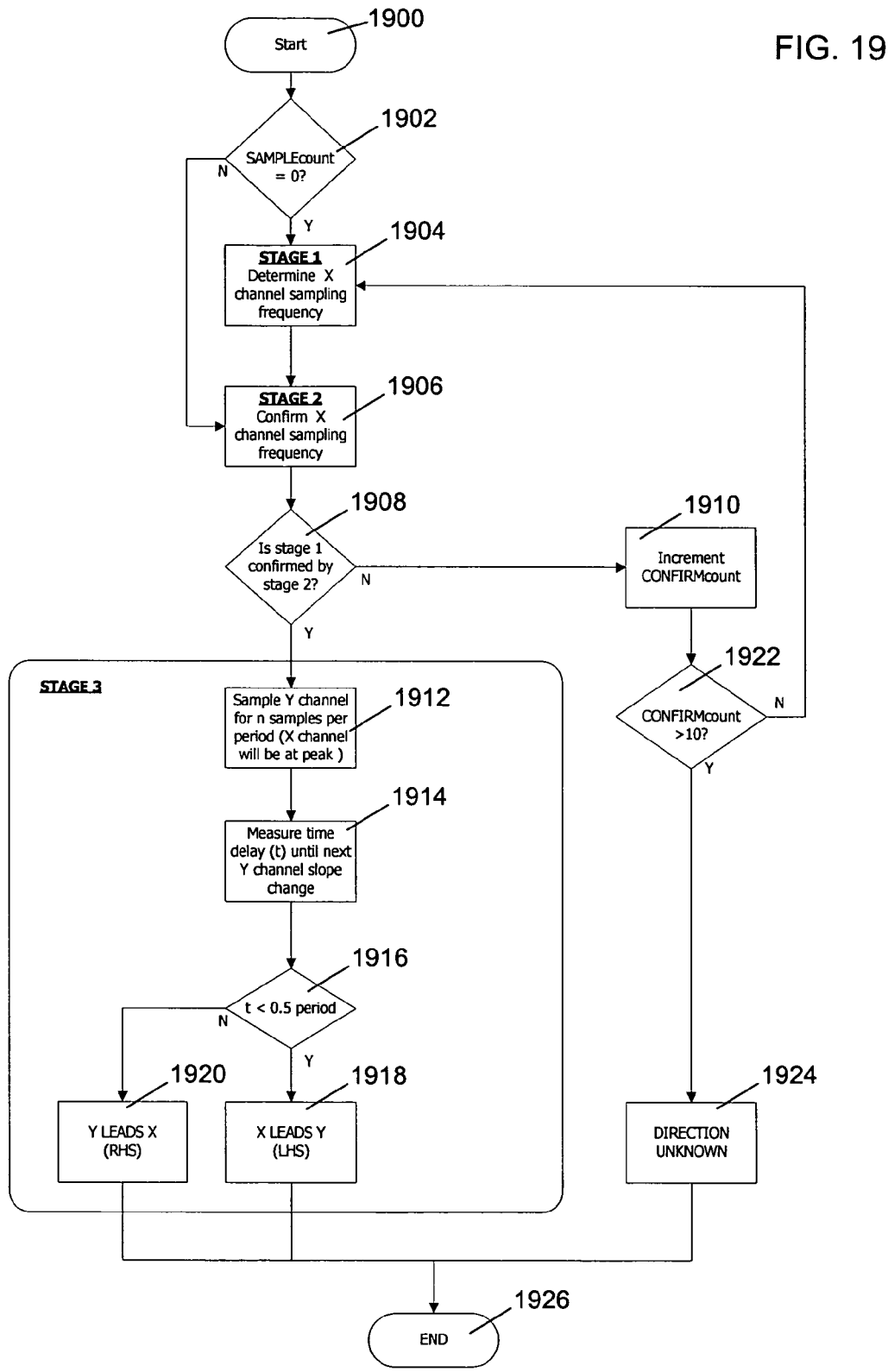

FIG. 19 illustrates one embodiment of the procedure Get Direction Sample of FIG. 18. The procedure begins at block 1900. At block 1902, the control circuit tests the value of the variable SAMPLEcount. This variable is reset to zero at the beginning of the procedure Get Direction, described above in conjunction with FIG. 18. This variable is incremented after the first call to the procedure Get Direction Sample. If SAMPLEcount equals 0, indicating the first call of the procedure Get Direction Sample by the procedure Get Direction, control proceeds to block 1904. Otherwise, if SAMPLEcount equals a value other than 0, control proceeds to block 1906.

At block 1904, the acts described above in conjunction with the first stage of the wireless autolocation process are performed. The tire monitor makes an estimate of the proper sampling frequency to use for sampling the shock sensor channel signals.

At block 1906, the acts described above in conjunction with the second stage of the wireless autolocation process are performed. The tire monitor confirms the proper sampling frequency to use for sampling the shock sensor channel signals.

At block 1908, it is determined if the result produced by stage 1, block 1904, is confirmed by the result produced by stage 1, block 1906. If there is no confirmation, control proceeds to block 1910 where the variable CONFIRMcount is incremented. Otherwise control proceeds to block 1912.

At blocks 1912, 1914, 1916, 1918 and 1920, the acts described above in conjunction with the third stage of the wireless autolocation process are performed. At block 1912, the control circuit samples the Y channel shock sensor sample signal for a predetermined number of samples, illustrated in FIG. 19 as n samples, per period of the shock sensor sample signal. In one exemplary embodiment, n is a fixed number such as 16. Any suitable value may be used. The peak value of the X channel shock sensor sample signal is then determined. At block 1914, the time delay t is measured until the next Y channel shock sensor sample signal slope change occurs.

At block 1916, the value of t is compared to one-half the value of the period of the X channel and Y channel shock sensor sample signals. If t is less than this value, at block 1918 the procedure determines that the X channel signal leads the Y channel signal and the value returned by the procedure is set to LHS. Otherwise, at block 1920, the procedure confirms that the Y channel signal leads the X channel signal and the value returned by the procedure is set to RHS.

If, at block 1908 stage 1 was not confirmed by stage 2 and the variable CONFIRMcount is incremented at block 1910, at block 1922 the value of CONFIRMcount is tested against a predetermined value, such as 10. If CONFIRMcount does not exceed the predetermined value, control returns to block 1904 to repeat stage 1 of the process. Otherwise, an error has occurred and at block 1924 value returned by the procedure is set to UNKNOWN. The procedure ends at block 1926.

Figure 20:
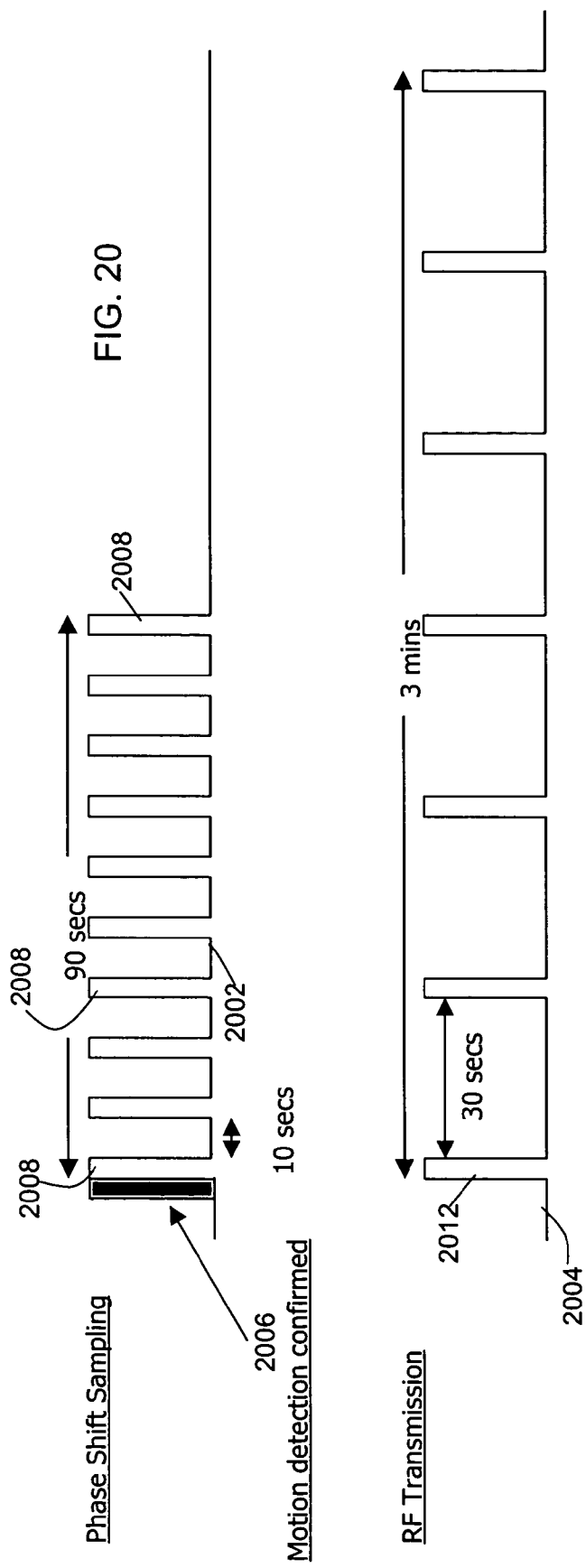
FIG. 20 is a timing diagram illustrating a second embodiment of a wireless autolocation process for a tire monitor in a vehicle.

FIG. 20 is a timing diagram illustrating a second embodiment of a wireless autolocation process for a tire monitor in a vehicle. The process illustrated in FIG. 20 will be described below in greater detail in conjunction with FIGS. 21-23. In FIG. 20, a signal 2002 illustrates activity of the tire monitor to sample shock sensor output signals provided by shock sensors of the tire monitor. Signal 2004 illustrates activity of the tire monitor to transmit data using the radio circuit of the tire monitor. The transmissions are intended for reception by a receiver of the vehicle on which the tire monitor is mounted.

The wireless autolocation process begins at a point 2006 when motion detection has been confirmed for the tire monitor. Prior to the point 2006, the shock sensors of the tire monitor have been used as motion detectors to determine if the tire monitor is in the stationary state or if the tire monitor is in motion. Once motion is confirmed, for example as described herein, the wireless autolocation process begins. In the alternative, any other suitable motion detection device or routine may be used.

In the illustrated embodiment, the wireless autolocation process involves nine direction decision periods 2008. Each direction decision period occurs approximately every 10 seconds so that the phase shift sampling process of the wireless autolocation routine takes approximately 90 seconds from the first detection of motion. After motion detection is confirmed at point 2006, during a first direction decision period, the tire monitor samples the shock sensor signals to estimate direction of wheel rotation. After a 10 second delay, during a second direction decision period, the tire monitor again samples the shock sensor signals to estimate direction of wheel rotation. This process continues for a predetermined number of direction decision periods. In the illustrated example, 9 such direction decision periods are used. In other embodiments, the direction decision periods could continue so long as the wheel is determined to be in motion or for any duration.

During this time, the tire monitor is periodically emitting radio frequency (RF) transmissions with appropriate data, as is indicated by the signal 2004. A first RF transmission 2012 occurs upon confirmation of motion detection at point 2006. During the wireless autolocation (WAL) process, each WAL transmission includes, for example, mode definition data, tire data such as data defining tire pressure or tire temperature, tire monitor identification data and direction data defining the direction of rotation (clockwise or counterclockwise) as determined by the tire monitor. In the illustrated example, RF transmissions then occur approximately every 30 seconds. In this embodiment, RF transmissions occur over a period of approximately 3 minutes. The tire monitor in one embodiment then enters a normal transmission mode in which the frequency of RF transmission is substantially reduced unless an extraordinary condition (such as sudden deflation) is detected and in which no direction data is transmitted. In other examples, the tire monitor continues making WAL transmissions, including the direction data.

The second embodiment illustrated in FIG. 20 and described in more detail below may be appropriate in other environments and other countries. The second embodiment is particularly appropriate for use in the United States. In the United States, government regulations limit transmission at certain power levels to no more frequently than every 30 seconds. Regulations in Europe allow such transmissions every 10 seconds.

Figure 21:
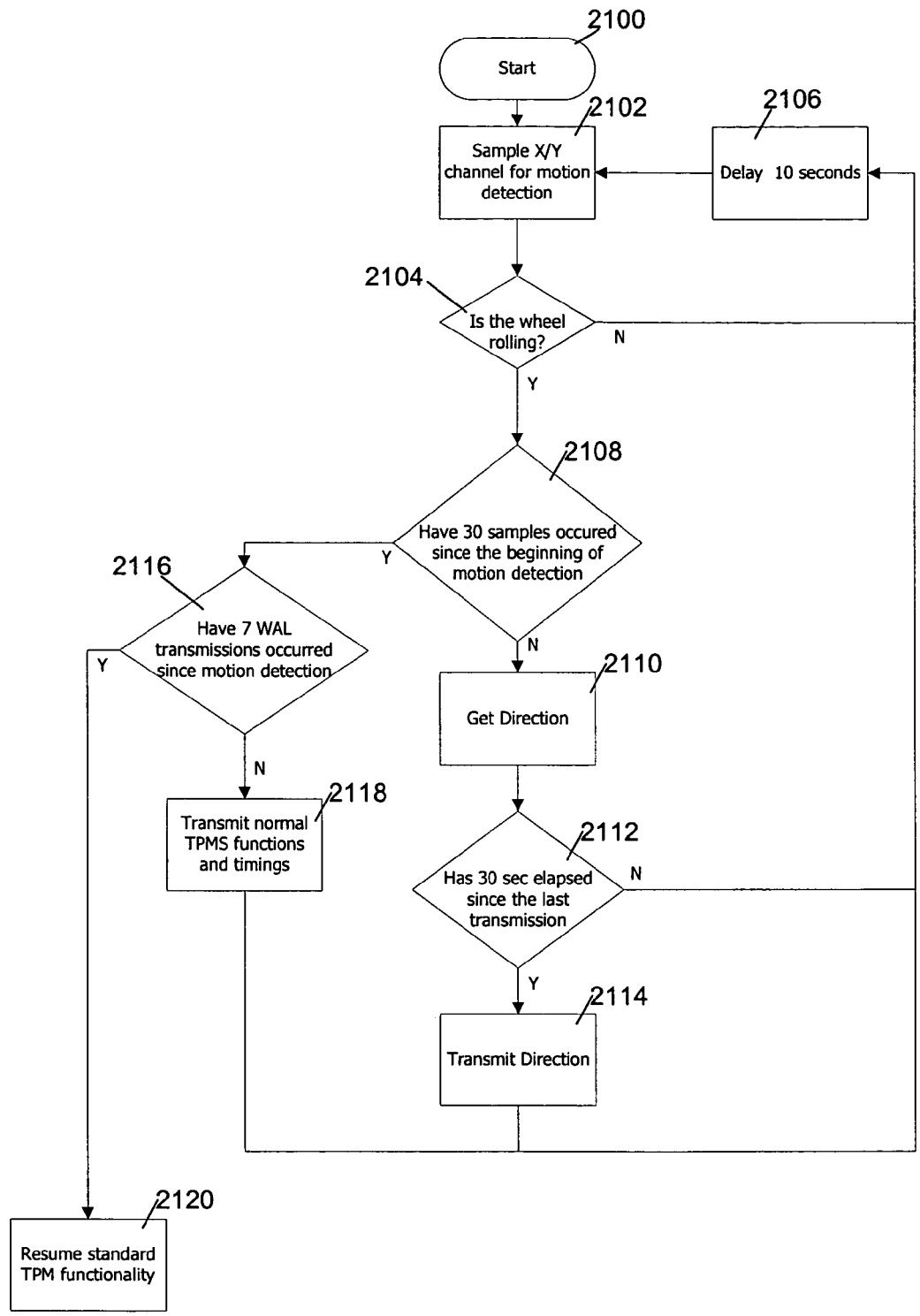
FIGS. 21-22 are flow diagrams illustrating the wireless autolocation process of FIG. 16.

FIG. 21 is a flow diagram illustrating one embodiment of a transmission strategy for a remote tire monitor. The illustrated embodiment may be particularly suitable for operation on vehicles in the United States. The method begins at block 2100. The actions illustrated in the flow diagram of FIGS. 21-23 may be performed in a control circuit by a processor or logic under software control by a computer program code stored in memory of the tire monitor. Additional steps necessary for complete operation of the system are omitted for clarity but will be apparent to those ordinarily skilled in the art.

At block 2102, the control circuit of the tire monitor samples the X channel and the Y channel to determine the condition of the shock sensor signals. One or both of the channels may be tested. The value determined gives an indication of the force exerted on the shock sensor and therefore the motion of the tire monitor and the wheel on which it is mounted. If the vehicle and the wheel are stationary, value from one value range will be returned. If the vehicle and the wheel are in motion above a certain speed, a value from another value range will be returned. The returned value can be used to determine the state of the tire monitor, either stationary or in motion.

At block 2104, the control circuit determines if the wheel is rolling, based on the value sampled at block 2102. If the wheel is not rolling, control proceeds to block 2106. The control circuit then waits a predetermined time, such as 10 seconds, and then loops back to block 2102 to again sample the X or Y shock sensor channels.

If the wheel is rolling at block 2104, at block 2108 the control circuit determines if a predetermined number of samples, such as 30 samples, have occurred since the beginning of motion detection. Any suitable threshold number may be used. If not, at block 2110 a procedure Get Direction is called to make a determination of the direction of rotation of the wheel. One example of the procedure Get Direction will be described below in conjunction with FIG. 22. After the direction is determined, the tire monitor determines if 30 seconds have elapsed since the last transmission block 2112. If not, control returns to block 2106 to delay for a predetermined period, such as 10 seconds, before again sampling the Y channel for motion detection.

If 30 seconds have elapsed since the last transmission, at block 2114 a procedure Transmit Direction is called. One exemplary embodiment of this procedure will be described below in conjunction with FIG. 23. The tire monitor under control of the control circuit transmits an RF transmission including data defining the determined direction. This may be referred to as a WAL transmission. Control then proceeds to block 2106 to await elapse of a 10 second period before again sampling the X and Y shock sensor samples.

If, at block 2108, 30 samples have occurred, control proceeds to block 2116. There, it is determined if 7 WAL transmissions have occurred since motion was detected by the tire monitor. If not, at block 2118, the tire monitor initiates a normal RF transmission, including mode data, tire monitor identifier and tire data. Control then proceeds to block 2106 to await elapse of a 10 second period before again sampling the X and Y shock sensor samples.

If, at block 2116, 7 WAL transmissions have occurred, control proceeds to block 2120. At this point, the wireless autolocation routine ends and the tire monitor begins it normal operation, transmitting tire data at conventional intervals.

Figure 22:
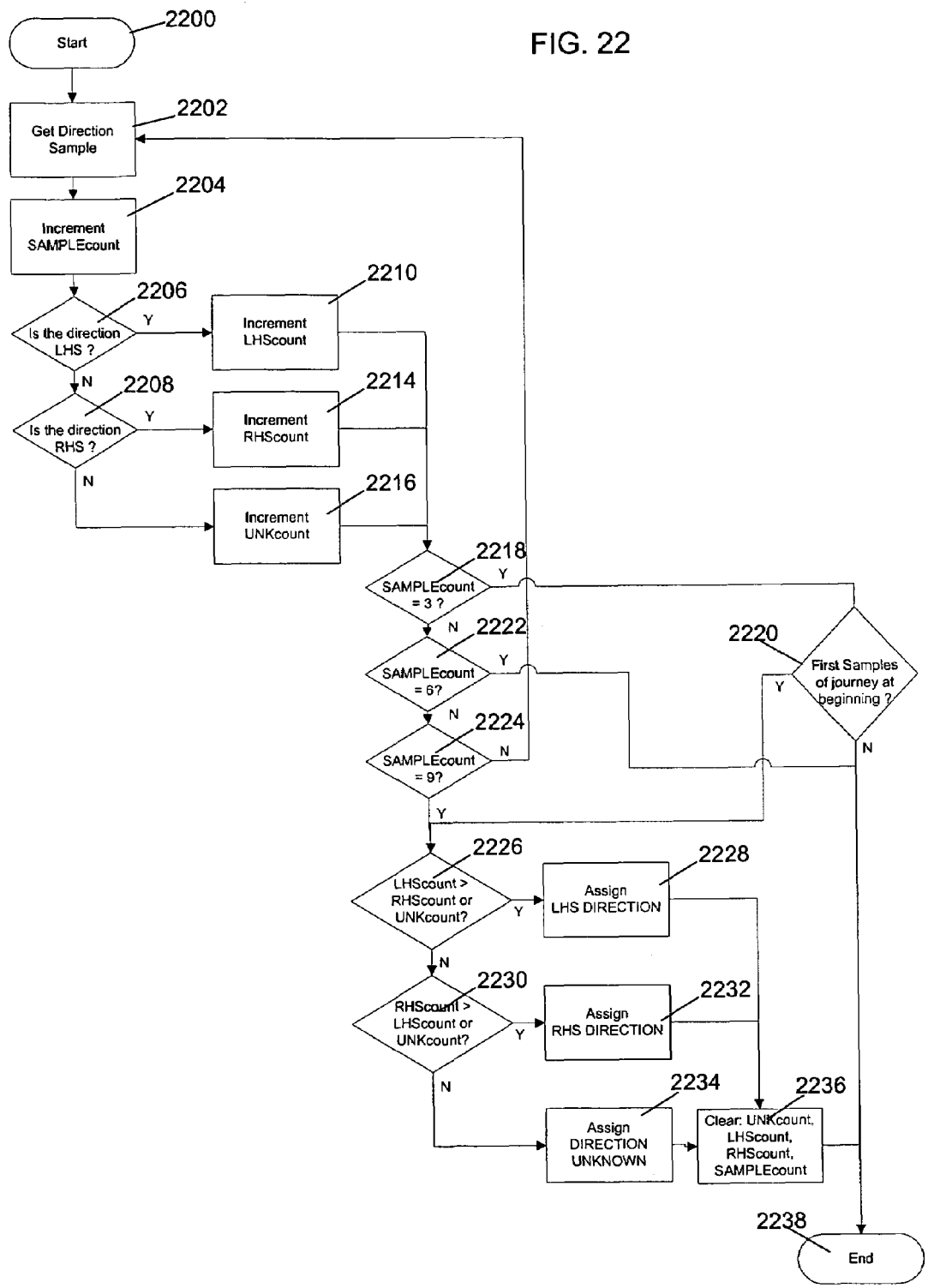

FIG. 22 illustrates one embodiment of the procedure Get Direction of FIG. 21. The procedure begins at block 2200. At block 2202, the control circuit calls a procedure Get Direction Sample. One example of this procedure is described above in conjunction with FIG. 19. This procedure returns an estimate of the direction of rotation of the wheel on which the tire monitor is mounted, or stated equivalently, and estimate of the side of the vehicle on which the tire monitor and wheel are mounted. Possible returned values are RHS for right hand side and LHS for left hand side. At block 2204, the control circuit increments the value of a variable SAMPLEcount.

At block 2206, the control circuit evaluates the value returned by the procedure Get Direction Sample. If the value corresponds to LHS, at block 2210 the control circuit increments the value of the variable LHScount. If not, and if at block 2208 the value corresponds to RHS, at block 2214 the control circuit increments the value of the variable RHScount. If neither value is returned or the returned value is not recognized, at block 2216 the control circuit increments the value of the variable UNKcount. In all cases, control proceeds to block 2218.

Beginning at block 2218, the control circuit estimates the direction of rotation or the side of the vehicle on which the tire monitor is mounted. At block 2218, the control circuit tests the value of the variable SAMPLEcount. If SAMPLEcount is equal to a predetermined value, such as 3, control proceeds to block 2222. Otherwise, control proceeds to block 2220 where the value of SAMPLEcount is again tested. If the value of SAMPLEcount is equal to 6, the procedure ends at block 2238. Otherwise, control proceeds to block 2224 where the value of SAMPLEcount is tested again. If the value of SAMPLEcount is equal to 9, control proceeds to block 2226. Otherwise, control returns to block 2202 to call the procedure Get Direction Sample again to obtain another sample from the shock sensors.

If, at block 2218, SAMPLEcount had the value of 3, indicating that three samples have thus far been taken from the shock sensors, at block 2220 the control circuit determines if the three samples are the first samples taken at the beginning of a journey. This can be determined, for example, by testing the value of a logical flag which is reset at the start of a journey, when the shock sensor first detects the vehicle in motion after a prolonged stationary period. Block 2220 allows for the very first transmission after roll detection to occur. Thus, the first transmission is based on three shock sensor samples. Every other transmission will be based on nine shock sensor samples. If the result of block 2220 is affirmative, control proceeds to block 2226. Otherwise, the method ends at block 2238.

At block 2226, the control circuit tests the values of the variable LHScount, RHScount and UNKcount. If LHScount is greater than both RHScount and UNKcount, at block 2228 the value LHS is assigned as the value returned by the procedure Get Direction. At block 2230, if RHScount is greater than both LHScount and UNKcount, at block 2232 the value RHS is assigned as the value returned by the procedure Get Direction. Otherwise at block 2234, the value UNKNOWN is set as the output of the procedure. After each of blocks 2228, 2232, 2234, the values of the operating variables UNKcount, LHScount, RHScount and SAMPLEcount are reset and the method ends at block 2238. Only after performing one of blocks 2228, 2232, 2234 and assigning a direction are these variables reset. Otherwise, after intermediate loops through the procedure, the values of the variables remain intact for use in subsequent procedure calls.

Figure 23:
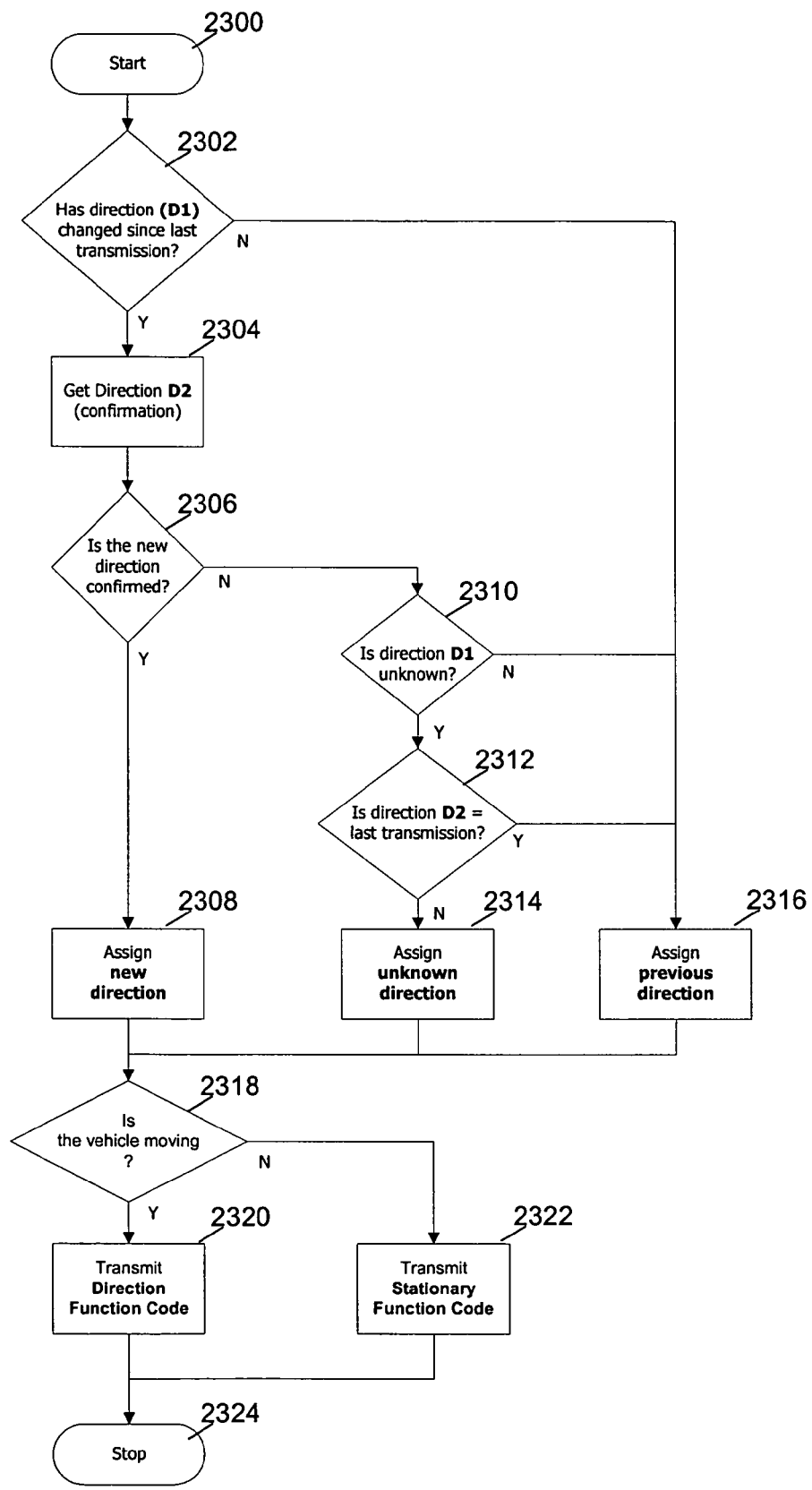
FIG. 23 is a flow diagram illustrating the transmit direction procedure of FIGS. 18 and 22.

FIG. 23 is a flow diagram illustrating one embodiment of a procedure Transmit Direction. This procedure may be called by the control circuit of a tire monitor to initiate a wireless autolocation (WAL) mode transmission of direction information to a receiver. As shown in FIG. 21, this procedure may be called after a call to the procedure Get Direction which returns an estimate of the side of the vehicle on which the tire monitor is located. This is stored as a variable with a value such as RHS or LHS. The procedure begins at block 2300. At block 2302, the control circuit determines if the value returned by the procedure Get Direction (referred to in FIG. 23 as direction value D1) has changed since the last time direction information was transmitted by the tire monitor. If no change is detected, control proceeds to block 2316.

If the control circuit determines that the direction of rotation or side of the vehicle on which the tire monitor is mounted has changed, at block 2304 the control circuit calls the procedure Get Direction. Exemplary embodiments of this procedure are described above in conjunction with FIGS. 18 and 22. The value returned by this procedure call is referred to in FIG. 23 as direction value D2. At block 2306, direction value D2 is compared with direction value D1 to confirm that the correct direction has been obtained. If the values match, control proceeds to block 2308 where the new direction value of D1 and D2 is assigned as the current direction value and the output value of the procedure.

Otherwise, if the direction value D2 does not confirm direction value D1, at block 2310 the control circuit determines if direction value D1 has a value of UNKNOWN. In this case, the values conflict and no reliable conclusion can be drawn. Rather than change the value in this circumstance, control proceeds to block 2316 and the previously determined direction value is assigned as the current direction and the output value of the procedure.

If at block 2310 direction value D1 was unknown, at block 2312 the control circuit determines if is equal to the value sent at the time of the last transmission. If so, this suggests that the direction has not changed and at block 2316 the previously determined direction value is assigned as current direction value and the output value of the procedure. Otherwise, at block 2314, the current direction value is assigned to a value of unknown.

Control then proceeds to block 2318 where the control circuit determines if the vehicle is moving. If so, at block 2320 the direction information is transmitted along with a Direction Function Code. Otherwise, at block 2322, the tire monitor transmits a Stationary Function Code.

In accordance with one embodiment, the tire monitors of the system transmit several data fields during any transmission. Each transmission is specific to the operating condition or mode of the tire monitor. Each transmission therefore includes mode bits or a mode code or function code which defines current operating information for the tire monitor. For example, if the tire monitor determines that it is stationary, it will transmit the stationary function code. This can be used by the receiver for diagnostic purposes. If the tire monitor is moving it may transmit the direction function code to indicate that is conveying updated direction information. This can be used by the receiver to update its own stored tire position information for the particular tire monitor. The method ends at block 2324.

Figure 24:
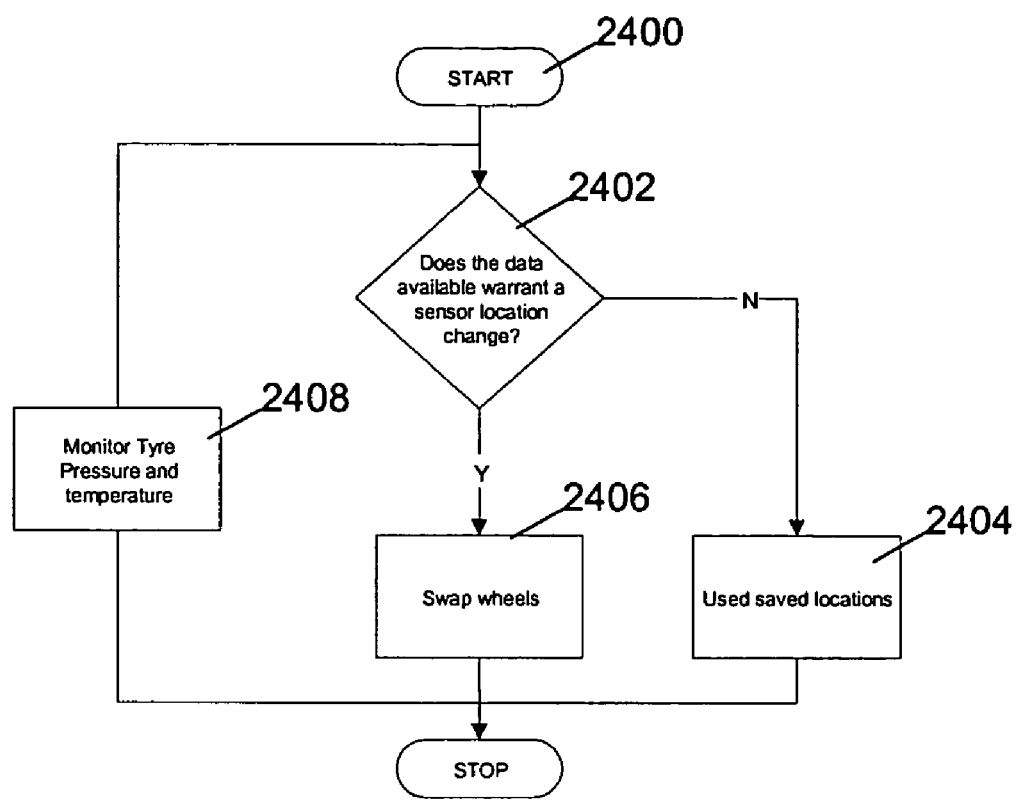
FIGS. 24-28 are flow diagrams illustrating operation of the remote tire monitor system of FIG. 1.

FIGS. 24-17 are flow diagrams illustrating operation of the remote tire monitor system of FIG. 1. FIG. 24 illustrates one embodiment of a method for locating tire monitors on a vehicle in a remote tire monitoring system of the type illustrated in FIG. 1. Such a system includes a control unit which is generally centrally located, such as in the dash of the vehicle, and tire monitors at each of the wheels of the vehicle. The method begins at block 2400.

In the illustrated embodiment, when the remote tire pressure monitoring system is initially powered on, for example by turning on the vehicle ignition, the pressure, temperature and sensor location information is monitored using previously stored sensor location data. This data may be stored in persistent memory, such as flash or electrically erasable programmable read only memory (EEPROM) of the control unit. After a predetermined time of driving, such as three minutes, the sensor locations are updated. In one embodiment, further location alterations are suppressed for the duration of the ignition cycle and journey.

Thus, at block 2402 of FIG. 24, the control unit determines if the data available warrant a sensor location change or update procedure. If not, the control unit will continue to use the saved tire monitor or sensor locations, block 2404. Otherwise, in response to a determination that the stored information may be out of date, the control unit begins a procedure to update its stored tire sensor location information, block 2406. Meanwhile, the control unit continues to monitor tire pressure data and temperature data received from the respective tire monitors, block 2408. If an out of range or abnormal condition is detected, a warning is provided.

Figure 25:
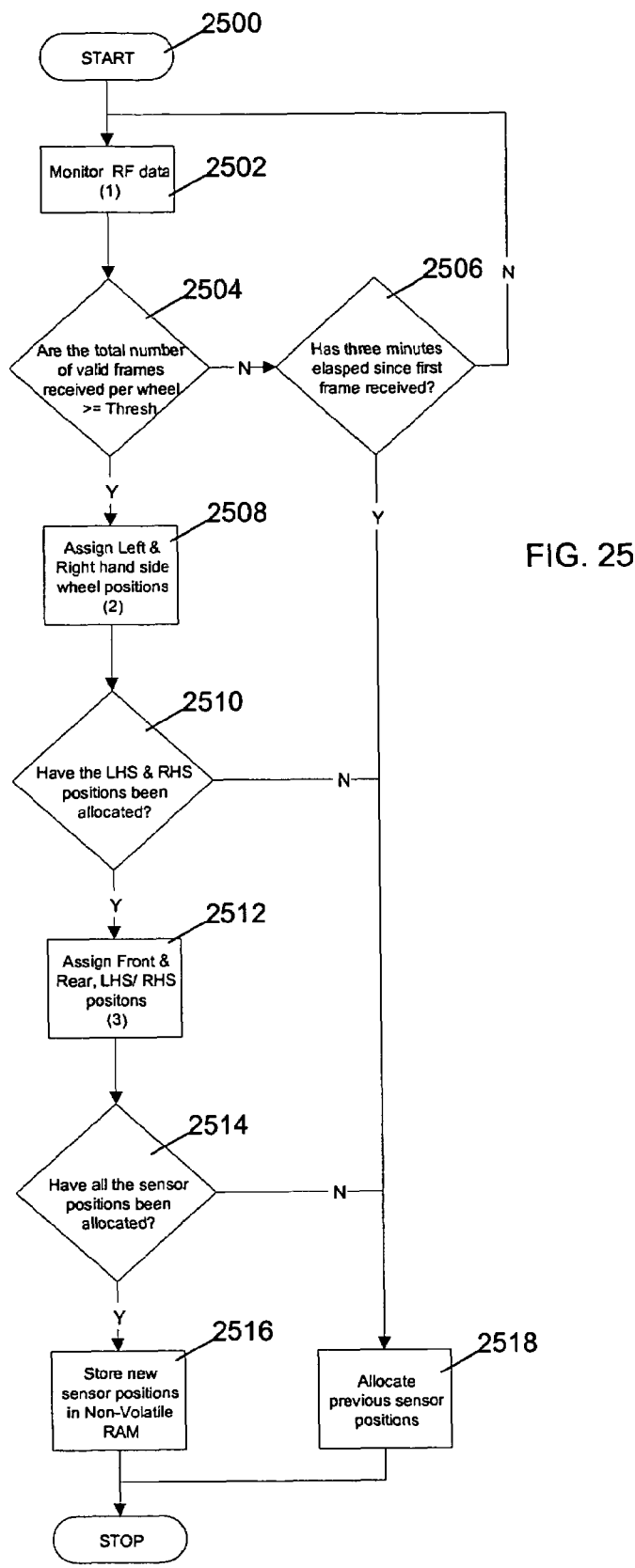

FIG. 25 illustrates one embodiment of a method for wireless autolocation of tire monitors in a remote tire pressure monitoring system. Autolocation refers to the ability of the components of the system to determine, without human intervention, the positions of the tire monitors on the wheels of the vehicle. This includes resolving left from right locations and front from rear locations. The location information is used to provide complete information to the operator of the vehicle, including identifying which tire monitor has detected an out of range or emergency condition. In the method exemplified by FIG. 25, the centrally located control unit receives tire monitor transmissions and allocates the detected tire monitors to positions on the vehicle. FIG. 25 illustrates a procedure performed by the control unit of the system which may be called by another functional routine of the control unit and which represents control activity implemented by the microcontroller or other control logic of the control unit. The method begins at block 2500.

At block 2502, a procedure Monitor RF Data is called by the control unit. One embodiment of the procedure Monitor RF Data will be described in detail below in conjunction with FIG. 26. This procedure retrieves and processes data received in and RF transmission from a tire monitor. Each tire monitor preferably transmits data at periodic intervals. Each frame generally includes a predetermined number of repeated frames of the same data to ensure reliable reception. In one example, each tire monitor transmission includes eight frames of data. The transmitted data in one embodiment include the unique identification code of the transmitting tire monitor, tire data such as pressure and temperature, mode data, defining the current mode of operation of the transmitting tire monitor, direction information defining the direction of rotation determined by the transmitting tire monitor for the wheel on which it is mounted, and verification information such as a checksum.

At block 2504, the control unit determines if the number of valid frames exceeds a predetermined threshold. A valid frame is one in which none of the received data includes obvious errors and the checksum or other verification information is without error. The predetermined threshold may be five of eight received frames. Any other number may be used to ensure reliable reception of data.

If the total number of valid frames does not exceed the threshold, at block 2506 the control unit determines if three minutes has elapsed since the first frame was received. If not, the system has not timed out and control returns to block 2502 to process additional received RF data. Otherwise, control proceeds to block 2518 where the previous sensor positions are allocated to the currently detected tire sensors.

If the total number of valid frames exceeds the threshold, indicating that the frame has been reliably received, at block 2508 a procedure Assign Left and Right Hand Side Wheel Positions is called. One exemplary embodiment of this procedure will be described in detail below in conjunction with FIG. 27. This procedure attempts to allocate left hand side and right hand side positions on the vehicle to transmitting tire monitors.

At block 2510, the control unit determines if the side to side allocation was successful. If the left hand side and right hand side positions have not been allocated, control proceeds to block 2518 where the previous sensor positions are allocated to the currently detected tire sensors.

At block 2512 a procedure Assign Front and Rear, LHS/RHS Wheel Positions is called. One exemplary embodiment of this procedure will be described in detail below in conjunction with FIG. 28. This procedure attempts to allocate front and rear and left hand side and right hand side positions on the vehicle to transmitting tire monitors.

At block 2514, the control unit determines all tire monitor positions have been successfully allocated. If not, control proceeds to block 2518 where the previous sensor positions are allocated to the currently detected tire sensors. Otherwise, at block 2516, the newly allocated sensor positions are stored in persistent memory of the control unit, block 2516. The tire sensor position may be stored in any suitable form or format. For example respective memory addresses may be designated for the left front wheel, right front wheel, left rear wheel and right rear wheel and the unique tire monitor identification codes stored in those designated memory addresses. Tire data such as pressure data and temperature data may then be stored at memory addresses associated with the designated memory addresses.

Figure 26:
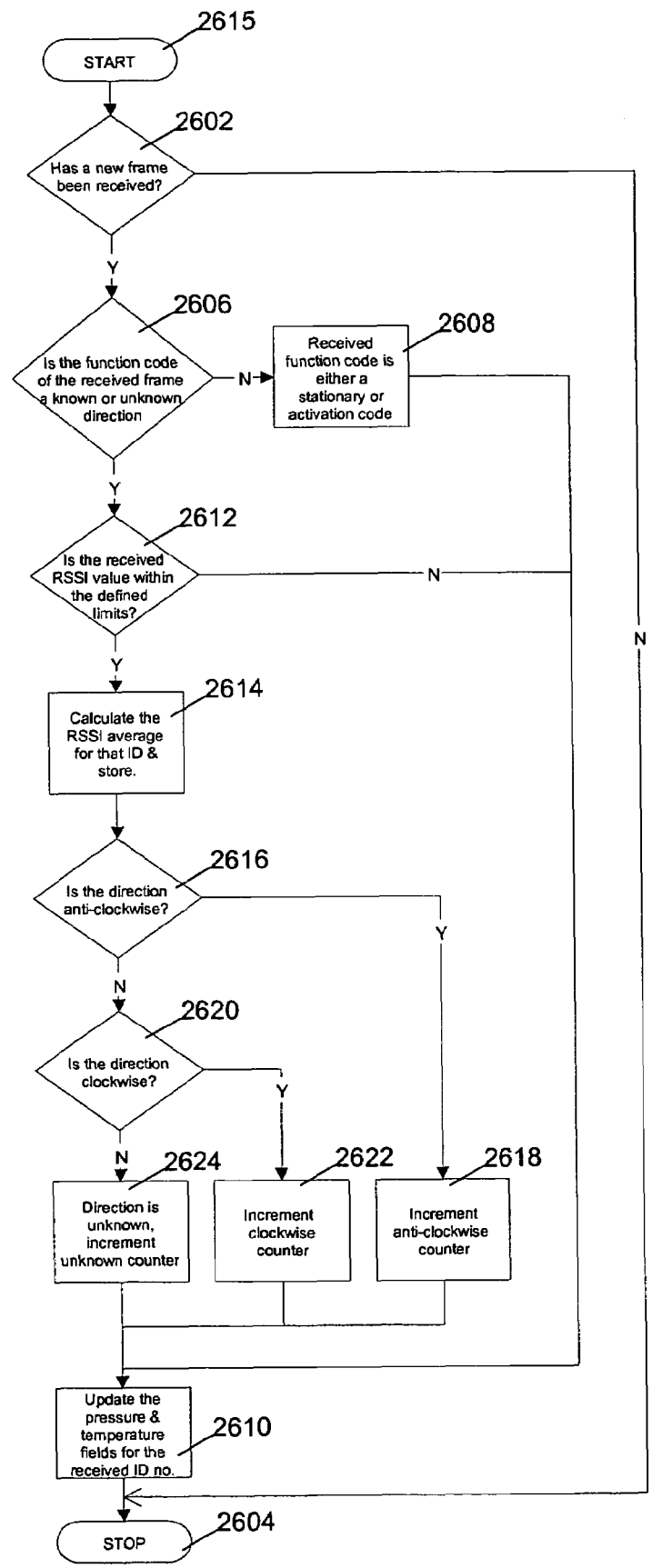

FIG. 26 illustrates one embodiment of a procedure or subroutine Monitor RF Data. The illustrated embodiment is suitable for use in a control unit such as the control unit 110 of FIG. 1 in which a RF circuit receives RF transmissions which are decoded to digital data by an RF decoder and subsequently conveyed to a microcontroller. FIG. 26 illustrates a procedure performed by the control unit of the system which may be called by another functional routine of the control unit and which represents control activity implemented by the microcontroller or other control logic of the control unit. The method begins at block 2600.

At block 2602, it is determined if a new frame has been received. Tire monitors of the system transmit frames of data including, for example, a mode indicator or function code which indicates the operational mode of the tire monitor and nature of the received frame, tire data such as pressure or temperature, the unique tire identification code, rotation direction data, and a checksum or other verification information. If no new frame has been received, the method terminates at block 2604.

If a new frame has been received, at block 2606 the function code contained in the frame is evaluated. It is determined if the function code of the frame corresponds to a known or unknown direction of rotation as determined by the tire sensor. If not, at block 2608, the control unit concludes that the received function code is a stationary code or an activation code. Control then proceeds to block 2610 where the controller retrieves the pressure and temperature or other tire data as well as the tire monitor identification code from data decoded from the received frame. The pressure and temperature values stored in association with the tire monitor identification code are updated with the new values. The method then terminates at block 2604.

At block 2612, the controller determines if the received signal strength indication (RSSI) value is within predetermined limits. This may be determined in any suitable manner. If not, control proceeds to block 2610. If the RSSI is within range, at block 2614, the control unit calculates an average RSSI value for the received transmissions from the tire sensor as identified by the identification code in the received frame. In one exemplary embodiment, an accumulation of all RSSI values is stored for each wheel. To average, the stored value is divided by the number of frames received for a given wheel. The calculated average RSSI is then stored for subsequent use.

At block 2616, the rotation direction field of the received frame is retrieved. If the rotation direction field indicates that the tire monitor has determined it is rotating in an anti-clockwise direction, control proceeds to block 2618. At block 2618, an anti-clockwise counter value is incremented. The anti-clockwise counter may be stored in memory of the microcontroller or other processor of the control unit. Control then proceeds to block 2610.

At block 2616, if the rotation direction field of the received frame does not indicate anti-clockwise rotation, at block 2620 the control unit determines if the rotation direction field indicates that the tire monitor has determined it is rotating in a clockwise direction. If so, control proceeds to block 2622. At block 2622, a clockwise counter value is incremented. The clockwise counter may be stored in memory of the microcontroller or other processor of the control unit. Control then proceeds to block 2610.

At block 2620, if the direction of rotation is not clockwise, control proceeds to block 2624. At block 2624, since the rotation was neither clockwise nor anti-clockwise, the control unit determines that the rotation direction is unknown. Accordingly, the value of an unknown counter is incremented. The unknown counter may be stored in memory of the microcontroller or other processor of the control unit. Control then proceeds to block 2610.

As noted, at block 2610, the pressure and temperature values for the tire monitor from which the current frame was received are updated in memory. The Monitor RF Data procedure then ends at block 2604.

Figure 27:
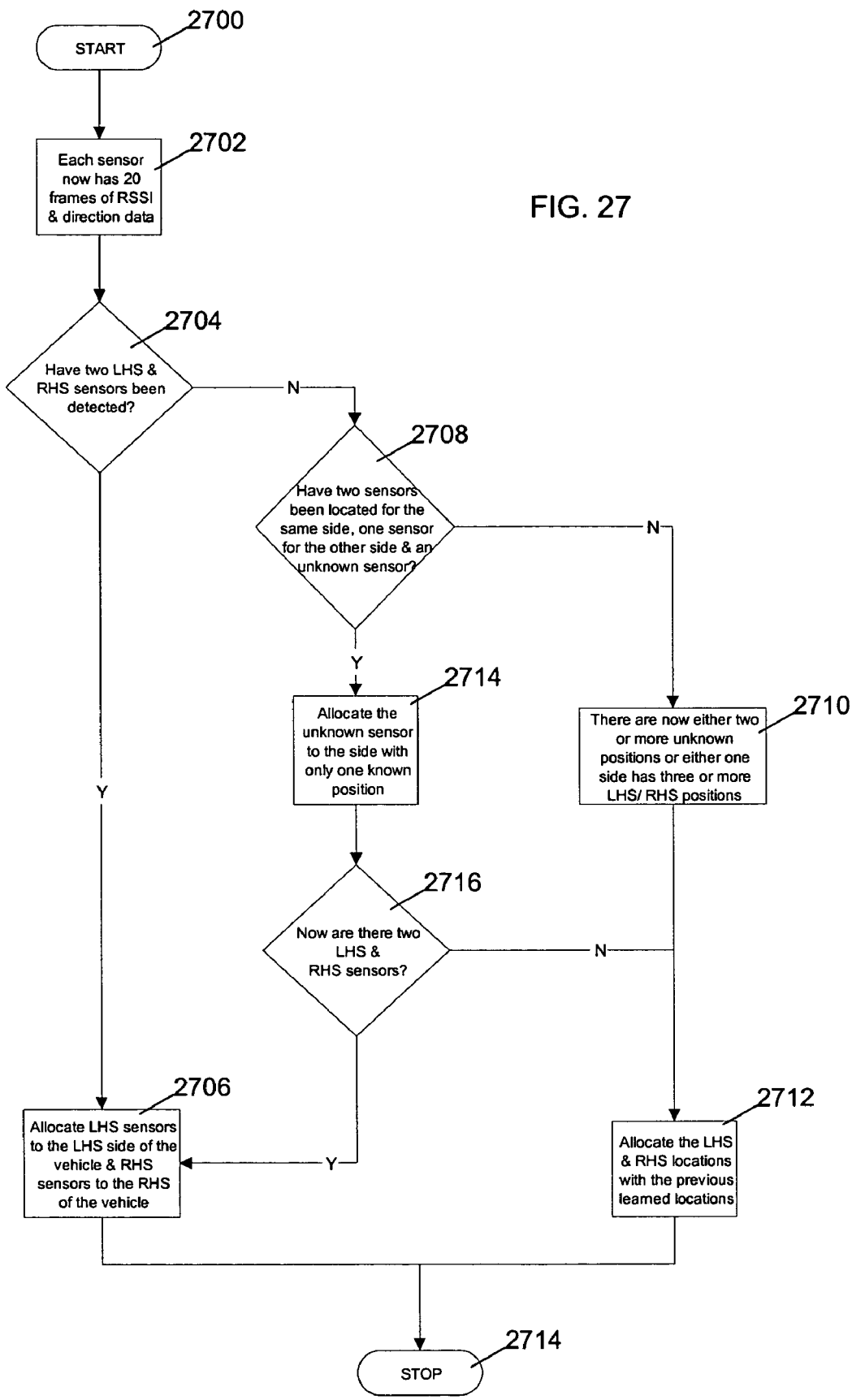

FIG. 27 illustrates one embodiment of a procedure Assign Left and Right Hand Side Wheel Positions. FIG. 27 illustrates a procedure performed by the control unit of the system which may be called by another functional routine of the control unit and which represents control activity implemented by the microcontroller or other control logic of the control unit. The method begins at block 2700.

At block 2702, the control unit determines that, for each tire sensor on the vehicle, at least 20 frames have been received. The 20 frames include both received signal strength indication (RSSI) data and wheel rotation direction data. The number of frames specified for the exemplary embodiment is 20. In other embodiments, other numbers of frames may be used. In other embodiments also, the acceptable number of received frames for each tire sensor may be set to different threshold values.

At block 2704, the control unit determines if two tire sensors located on the left hand side of the vehicle and two tire sensors located on the right hand side of the vehicle have been detected. This is determined from the wheel rotation direction data stored for each tire monitor. If so, at block 2706, the control unit allocates the left hand side sensors to the left hand side of the vehicle and the right hand side sensors to the right hand side of the vehicle.

The allocation process may occur in any suitable manner. In one example, designated memory addresses are each assigned to the left front, left rear, right front and right rear wheels. In vehicles with more wheels, more memory addresses are designated with suitable identifiers. When a tire sensor is allocated to a position on the vehicle, the unique identification code for the tire sensor may be stored at the designated memory address. Associated data, such as tire pressure data and temperature data, may be stored at associated memory addresses. In another example, the tire sensor identification codes are stored in non-volatile memory and associated locations store data defining the position allocation information. As the position of the tire monitor on the vehicle is determined and the tire monitor is allocated to a particular position, the control unit stores appropriate data in the associated locations which store the data defining the position allocation information. Other allocation processes may be used as well.

If, at block 2704, two left side and two right side sensors have not been detected, at block 2708, the control unit determines if two sensors have been located for the same side and, at the same time, one sensor has been located for the other side along with an unknown sensor. Again, this can be determined using the wheel rotation direction information reported by the tire sensors in their RF transmissions. If this condition is met, the unknown sensor is likely new to the vehicle and therefore the control unit allocates the unknown sensor to the side of the vehicle with only one known sensor, block 2714. To confirm, at block 2716, the control unit determines if there are now two left hand side and two right hand side sensors. If so, control proceeds to block 2706 to complete the allocation. If not, control proceeds to block 2712.

If the test at block 2708 failed, at block 2710 the control unit determines that of the four tire sensors identified, there are two or more unknown positions or one side has three or more tire sensors designated for that side. At block 2712, the controller defaults to a condition of allocating the left and right side locations with previously learned locations.

The subroutine ends at block 2714. The subroutine returns the allocated positions of the tire sensors on the vehicle.

Alternative embodiments may be implemented, as well. Instead of the process described above of making a conclusion about the direction of wheel rotation at each tire sensor and transmitting data defining that direction, other information may be transmitted instead or in addition to the direction decision. In one embodiment like that described above in connection with FIG. 21 the shock sensor output signals are sampled 10 times when making a left/right decision. The result of each sample is a left/right decision value, as shown, for example, in FIG. 22. A right hand counter or a left hand counter is incremented based on the left/right decision. The right hand counter stores a right hand counter value and the left hand counter stores a left hand counter value. At the end of the 10 samples, whichever counter has the greatest number or value (left or right) determines the data defining the direction to be transmitted from the tire sensor. In this embodiment, only the direction information is transmitted.

However, in alternative embodiments, data may also be sent indicating how strong the direction decision is, or the degree of confidence in the direction decision, or the degree of confidence in the position information (left or right hand side of the vehicle) determined for the sensor on the vehicle. In a first embodiment, the values stored in the two counters are transmitted, either along with the right/left direction data or instead of that direction data. In a second embodiment, a number is transmitted which represents how strongly the decision is made, or the level of confidence in the decision is. For example, the transmitted number may be selected as shown below:

| Transmitted Value | Relative Confidence | Right/ Left | Interpretation |
| --- | --- | --- | --- |
| 0 | 100% | RHS | All decisions on right hand side |
| 1 | 80% | RHS | Very strong bias towards the right hand side |

-continued

| Transmitted Value | Relative Confidence | Right/ Left | Interpretation |
|---|---|---|---|
| 2 | 60% | RHS | Strong bias towards the right hand side |
| 3 | 40% | RHS | Medium bias towards the right hand side |
| 4 | 20% | RHS | Unknown - slight bias towards the right hand side |
| 5 | 0% | | Unknown - equal left and right |
| 6 | 20% | LHS | Unknown but slight bias towards the left hand side |
| 7 | 40% | LHS | Medium bias towards the left hand side |
| 8 | 60% | LHS | Strong bias towards the left hand side |
| 9 | 80% | LHS | Very strong bias towards the left hand side |
| 10 | 100% | LHS | All decisions on left hand side |

Thus, if all decisions by the tire sensor have been that the sensor is on the right hand side of the vehicle, the sensor will conclude that it is 100 percent confident of that decision and transmit a value of 0. Upon reception at the control unit, the data value interpreted in that same manner. If less then all the decisions (say, 9 of 10 decisions) have been that the sensor is on the right hand side, the sensor will still conclude that it is on the right hand side, but with a lower confidence level. The value 1 is transmitted to indicate this and will be interpreted accordingly at the control unit. Any of the remaining values may be selected for transmission as well, dependent on the mix of decisions reached based on the contents of the LHS, RHS counters.

Other data values may be used or substituted. For example three, four or more bits may be used to encode the decimal value, or an octal, hexadecimal or other scheme similar to that illustrated in the table above may be use instead. In this manner of encoding, transmission requirements can be kept relatively low while conveying substantially more information about the left right decision.

Figure 28:
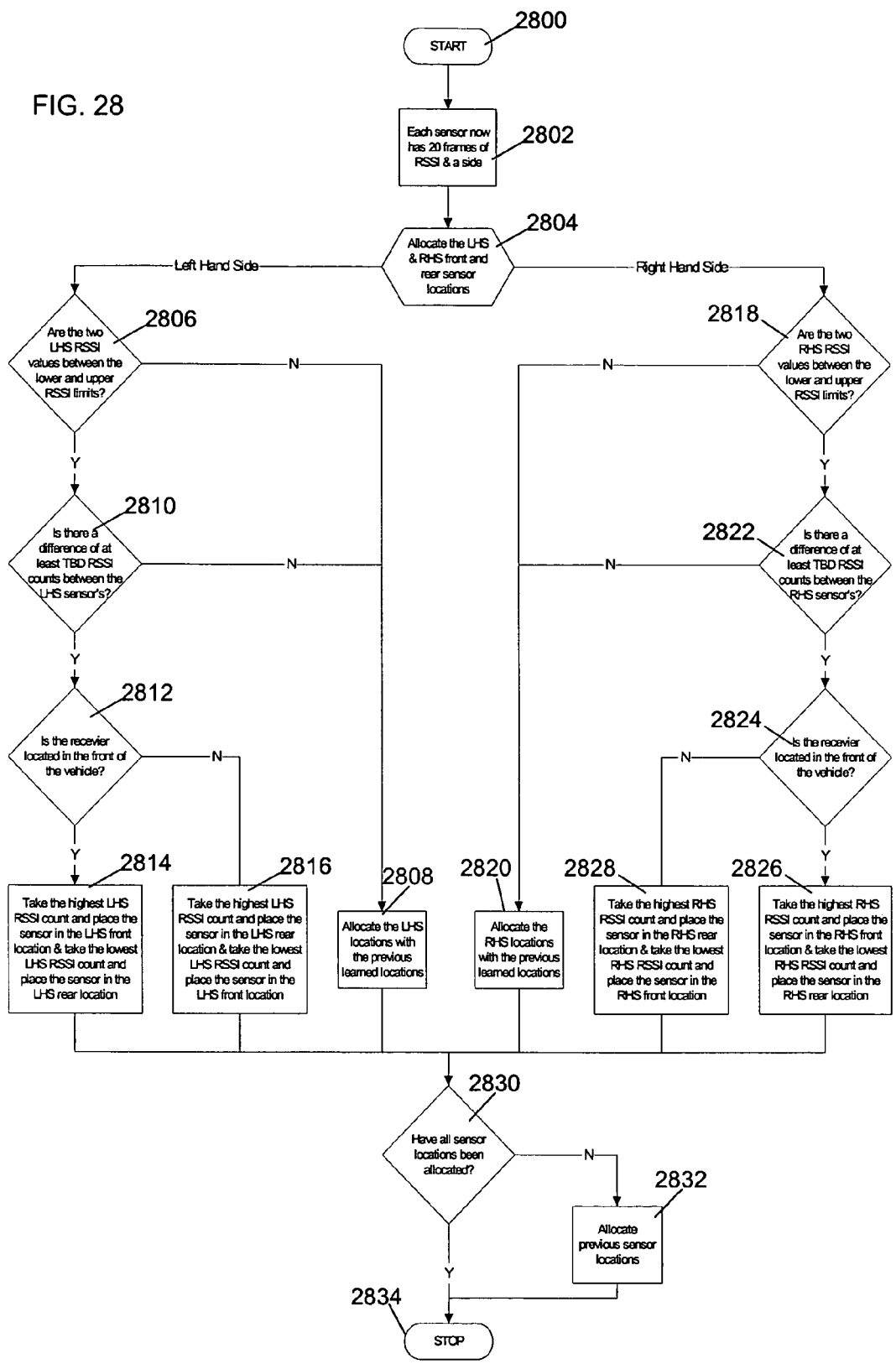

FIG. 28 illustrates one embodiment of a procedure Assign Front and Rear, LHS/RHS Wheel Positions. FIG. 28 illustrates a procedure performed by the control unit of the system which may be called by another functional routine of the control unit and which represents control activity implemented by the microcontroller or other control logic of the control unit. The method begins at block 2800.

At block 2802, the control unit determines that, for each tire sensor on the vehicle, at least 20 frames have been received. The 20 frames include both received signal strength indication (RSSI) data and wheel rotation direction data. The number of frames specified for the exemplary embodiment is 20. In other embodiments, other numbers of frames may be used. In other embodiments also, the acceptable number of received frames for each tire sensor may be set to different threshold values.

At block 2804, a process to allocate the left hand side and right hand side front and rear sensor locations. For processing the left hand side sensors, at block 2806, the control unit compares RSSI data values with predetermined limit values. The control unit determines if there are RSSI values within the range for two left hand side sensors. If not, control proceeds to block 2808 where the control unit defaults to allocating the left hand side locations with the previously learned tire sensor locations.

In accordance with one embodiment, an RSSI temperature compensation technique is provided to ensure reliable operation of the system. Each wheel mounted tire sensor will have an output power that must comply with the specification for the component and the system. A typical value of specified output power is 65 dBuV+5/−3 dBuV, measured at 3 m. This means that each tire sensor, when measured on any wheel rim at any temperature within the specified minimum-maximum operating temperature range of −40 C to +100 C, will have a power output between the values of 62 dBuV to 70 dBuV. In order for the wireless autolocation system described herein to operate reliably, the power spread across the transmitters on the vehicle must be minimized in order to reliably distinguish between transmission from front and rear wheels. Part of the power spread is due to piece to piece component tolerances. Another part of the power spread is also due to temperature of the respective tire sensors. Not all transmitters will be at the same temperature due to braking or seized brake calipers etc.

The temperature RF variance effect can be minimized by compensating the RSSI value. This is achieved in one embodiment by monitoring the received temperature data transmitted by each tire sensor as part of its transmitted tire data. The measured RSSI value is adjusted for the tire sensor in question in the software of the receiver or control unit. Any suitable compensation algorithm can be used, such as using a look-up table of RSSI adjustment values versus received temperature. This can be accomplished by a processor of the control unit processing received and stored data to implement a compensation circuit, or by use of a dedicated compensation circuit which adjusts or compensates RSSI values using the received temperature information from a transmitting tire monitor. Temperature compensation of RSSI can reduce the tolerance spread by approximately 3 dB, producing a much more reliable system.

If at block 2806 there were RSSI values within the predetermined range for two left hand side sensors, at block 2810 the control unit determines if received signal strength for one of the left hand side sensors is greater than for the other. This is done in one embodiment by comparing RSSI counts for the two left hand side sensors and a difference value. RSSI counts correspond to the average analog to digital converter reading or value for a given wheel or tire sensor on the vehicle. When a frame is received, an RSSI counter for the tire sensor is incremented. If the difference between RSSI counts for the two left hand side tire sensors does not exceed a threshold value, control proceeds to block 2808 where the control unit defaults to allocating the left hand side locations with the previously learned tire sensor locations. Otherwise, if the difference between RSSI counts for the two left hand side tire sensor exceeds the threshold value, the control unit can conclude that one of the tire sensors is closer to the receiver so that the RSSI is typically stronger than the other tire sensor which is farther from the receiver. At block 2812 the control unit determines if the receiver is located at the front of the vehicle. This information can be retrieved from a preprogrammed storage location.

If the receiver is located at the front of the vehicle, at block 2814, the left hand side tire sensor with the highest RSSI count is allocated to the left front location on the vehicle. Similarly, the left hand side tire sensor with the lowest RSSI count is allocated to the left rear location on the vehicle. Alternatively, if the receiver is not located at the front of the vehicle, at block 2816, the left hand side tire sensor with the highest RSSI count is allocated to the left rear location on the vehicle and the left hand side tire sensor with the lowest RSSI count is allocated to the left front location on the vehicle.

On the other hand, at block 2818, a process to allocate the right hand side front and rear sensor locations begins. For processing the right hand side sensors, at block 2818, the control unit compares RSSI data values with predetermined limit values. The control unit determines if there are RSSI values within the range for two right hand side sensors. If not, control proceeds to block 2820 where the control unit defaults to allocating the right hand side locations with the previously learned tire sensor locations.

If at block 2818 there were RSSI values within the predetermined range for two right hand side sensors, at block 2822 the control unit determines if received signal strength for one of the right hand side sensors is greater than for the other. This is done in the illustrated embodiment by comparing RSSI counts for the two right hand side sensors and a difference value. If the difference between RSSI counts for the two right hand side tire sensors does not exceed a threshold value, control proceeds to block 2820 where the control unit defaults to allocating the right hand side locations with the previously learned tire sensor locations. Otherwise, if the difference between RSSI counts for the two right hand side tire sensor exceeds the threshold value, the control unit can conclude that one of the tire sensors is closer to the receiver so that the RSSI is typically stronger than the other tire sensor which is farther from the receiver. At block 2824 the control unit determines if the receiver is located at the front of the vehicle. This information can be retrieved from a preprogrammed storage location.

If the receiver is located at the front of the vehicle, at block 2826 the right hand side tire sensor with the highest RSSI count is allocated to the right front location on the vehicle. Similarly, the right hand side tire sensor with the lowest RSSI count is allocated to the right rear location on the vehicle. Alternatively, if the receiver is not located at the front of the vehicle, at block 2828, the right hand side tire sensor with the highest RSSI count is allocated to the right rear location on the vehicle and the right hand side tire sensor with the lowest RSSI count is allocated to the right front location on the vehicle.

At block 2830, the control unit determines if all sensor locations have been allocated. If not, at block 2832 previously learned sensor locations are allocated so that all locations are allocated for the vehicle. The procedure ends at block 2834. The procedure returns the allocated positions of the tire sensors on the vehicle.

In addition to determining the positions of the tire sensors on the vehicle, the embodiments disclosed herein also provide and indication of vehicle speed as determined at each tire sensor. This indication of vehicle speed can be transmitted by the tire sensor for receipt by the control unit and used to confirm that the received transmission came from a tire sensor mounted on the same vehicle.

Vehicle speed can be determined by the tire sensor because the shock sensor output signal is periodic with a period equal to one period of revolution of the wheel. Any acceleration signal that approximates the periodicity of the wheel revolution can be used for this purpose. This will not give true vehicle speed but just a relative indication of vehicle speed. The control unit of the vehicle, however, can obtain the actual vehicle speed over the CAN bus which conveys data internally among the components of the vehicle. The control unit can correlate the receive wheel speed/frequency data with the actual vehicle speed over the CAN bus. If there is a strong correlation, the control unit has increased confidence that it has received a transmission from a tire sensor on its own vehicle and not from an adjacent vehicle. Also, the RSSI levels for the same-vehicle transmitters will be stronger, adding to the robustness of the method of detecting which sensors are fitted to the vehicle.

From the foregoing, it can be seen that the present invention provides improved motion detection in a tire monitor of a remote tire pressure monitoring system. A mechanical roll switch in the tire monitor is replaced by a sensor and suitable interface circuitry. Two sensors are placed in the same plane and produce output signals in response to motion of the tire monitor. A phase lag/lead relationship of the output signals is used to determine information about motion of the tire monitor and the wheel on which it is mounted.

One specific embodiment of a suitable sensor is a shock sensor. The shock sensor is a piezoelectric device which provides an electrical output signal proportional to acceleration sensed by the shock sensor. Two methods of detecting motion are thus provided. In a first method, presence of a sinusoidal signal proportional to gravitational acceleration due to rotation of the wheel with the tire monitor can be detected. In a second method, wideband noise due to acceleration of the shock sensor can be detected to determine if the vehicle and tire monitor are in motion. Use of a solid state shock sensor in place of the mechanical roll switch provides a less expensive, more robust and durable solution which reduces power dissipation in the tire monitor. Further, the shock sensor used as a motion switch is surface mountable on a printed circuit board, eliminating a manual assembly step required for the mechanical switch and reducing manufacturing cost for the tire monitor.

Further, the present invention provides improved method and apparatus for sensor location in a remote tire pressure monitoring system. Side to side position is determined at the transmitter using a pair of piezoelectric motion sensors. A dual axis accelerometer or two single axis accelerometers are replaced by the shock sensors and suitable interface circuitry. This has the advantage of reducing cost, since the shock sensors combined cost less than half the cost of the dual axis accelerometer, which in turn is one half the cost of two single axis accelerometers. This also has the advantage of simplifying manufacture, since the shock sensors are packaged in a standard surface mount package for automated assembly to a printed circuit board. The circuit to reliably detect the output signal from the shock sensor is substantially simplified over that required to negate the centrifugal force detected by the prior accelerometer.

It is therefore intended that the foregoing detailed description be regarded as illustrative rather than limiting, and that it be understood that it is the following claims, including all equivalents, that are intended to define the spirit and scope of this invention.

The invention claimed is:

1. A motion detection method in a tire monitor configured for mounting on a vehicle in a remote tire monitoring system including a receiver, the method comprising:
   detecting an output signal of a shock sensor;
   based on the output signal, making a current motion conclusion;
   testing a last saved motion conclusion;
   if the current motion conclusion matches the last saved motion conclusion, transmitting data from the tire monitor for reception by the receiver;

if the current motion conclusion and the last saved motion conclusion indicate motion of the tire monitor, testing a motion decisions counter; and if the motion decisions counter exceeds a threshold, transmitting the data from the tire monitor and entering a low power sleep mode before again detecting the output signal of the shock sensor.

2. A motion detection method in a tire monitor configured for mounting on a vehicle in a remote tire monitoring system including receiver, the method comprising:

detecting an output signal of a shock sensor;

based on the output signal, making a current motion conclusion;

testing a last saved motion conclusion;

if the current motion conclusion matches the last saved motion conclusion, transmitting data from the tire monitor for reception by the receiver; and if the current motion conclusion does not match the last saved motion conclusion, entering a low power sleep mode before again detecting the output signal of the shock sensor.

3. A motion detection method in a tire monitor configured for mounting on a vehicle in a remote tire monitoring system including a receiver, the method comprising:

detecting an output signal of a shock sensor, wherein detecting the output signal of the shock sensor comprises:

sensing the output signal of the shock sensor;

based on the output signal, concluding the tire monitor is stationary or in motion;

upon a stationary conclusion, comparing the stationary conclusion with a previous conclusion;

if the previous conclusion matches the stationary conclusion, making the current motion conclusion that the tire monitor is stationary;

if the previous conclusion does not match the stationary conclusion, re-sensing the output signal of the shock sensor;

based on the re-sensed output signal re-concluding the tire monitor is stationary or in motion;

upon a stationary re-conclusion, making the current motion conclusion that the tire monitor is stationary; and upon a moving re-conclusion, incrementing a motion decision counter;

based on the output signal, making a current motion conclusion;

testing a last saved motion conclusion;

if the current motion conclusion matches the last saved motion conclusion, transmitting data from the tire monitor for reception by the receiver.

4. A motion detection method in a tire monitor configured for mounting on a vehicle in a remote tire monitoring system including receiver, the method comprising:

detecting an output signal of a shock sensor, wherein detecting the output signal of the shock sensor comprises:

sensing the output signal of the shock sensor;

based on the output signal, concluding the tire monitor is stationary or in motion;

upon a moving conclusion, comparing the moving conclusion with a previous conclusion;

if the previous conclusion matches the moving conclusion, making the current motion conclusion that the tire monitor is moving;

if the previous conclusion does not match the moving conclusion, re-sensing the output signal of the shock sensor;

based on the re-sensed output signal, re-concluding the tire monitor is stationary or in motion;

upon a moving re-conclusion, clearing a motion decision counter; and upon a stationary re-conclusion, making the current motion conclusion that the tire monitor is stationary;

based on the output signal, making a current motion conclusion;

testing a last saved motion conclusion;

if the current motion conclusion matches the last saved motion conclusion, transmitting data from the tire monitor for reception by the receiver.

5. A motion detection method in a tire monitor configured for mounting on a vehicle in a remote tire monitoring system including a receiver the method comprising:

detecting an output signal of a shock sensor, wherein detecting the output signal of the shock sensor comprises:

sampling the output signal of the shock sensor a plurality of times;

if a predetermined number of output signal samples exceed a threshold, incrementing a counter;

re-sampling the output signal of the shock sensor a second plurality of times;

if a second predetermined number of output signal samples exceed the threshold, incrementing the counter;

if the counter has been incremented twice, concluding setting a motion status flag to a moving value; and otherwise, setting the motion status flag to a stationary value;

based on the output signal, making a current motion conclusion;

testing a last saved motion conclusion;

if the current motion conclusion matches the last saved motion conclusion, transmitting data from the tire monitor for reception by the receiver.

6. The motion detection method of claim 5 further comprising: waiting a predetermined time duration between sampling and re-sampling the output signal.

7. A motion detection method in a tire monitor configured for mounting on a vehicle in a remote tire monitoring system including a receiver, the method comprising:

detecting an output signal of a shock sensor by alternately detecting an output signal of a first shock sensor and detecting an output signal of a second shock sensor;

based on the output signal, making a current motion conclusion;

testing a last saved motion conclusion; and if the current motion conclusion matches the last saved motion conclusion, transmitting data from the tire monitor for reception by the receiver.

* * * * *